(12) United States Patent
Nishio et al.

(10) Patent No.: US 12,330,552 B2
(45) Date of Patent: Jun. 17, 2025

(54) MOVING BODY

(71) Applicant: PANASONIC INTELLECTUAL PROPERTY MANAGEMENT CO., LTD., Osaka (JP)

(72) Inventors: Tsuyoshi Nishio, Chiba (JP); Masahiro Anezaki, Tokyo (JP); Takanao Yano, Kanagawa (JP); Makoto Hinata, Kanagawa (JP); Kanji Muto, Kanagawa (JP); Naoki Usui, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 1000 days.

(21) Appl. No.: 17/382,677

(22) Filed: Jul. 22, 2021

(65) Prior Publication Data
US 2021/0347415 A1 Nov. 11, 2021

Related U.S. Application Data

(63) Continuation of application No. PCT/JP2020/002619, filed on Jan. 24, 2020.

(30) Foreign Application Priority Data

Jan. 24, 2019 (JP) .................... 2019-010518
Jan. 24, 2019 (JP) .................... 2019-010519
(Continued)

(51) Int. Cl.
*B60Q 1/26* (2006.01)
*B60Q 1/50* (2006.01)
(Continued)

(52) U.S. Cl.
CPC ......... *B60Q 1/2692* (2013.01); *B60Q 1/5037* (2022.05); *B60Q 1/507* (2022.05);
(Continued)

(58) Field of Classification Search
CPC .... B60Q 1/2692; B60Q 1/507; B60Q 1/5037; B60Q 1/549; B60Q 1/543; B62D 24/00; B62D 27/06; G05D 1/021
(Continued)

(56) References Cited

U.S. PATENT DOCUMENTS 9,196,164 B1    11/2015  Urmson et al.
2002/0175830 A1*  11/2002  Hudson ............... G08G 1/0955
                                          340/908
(Continued)

FOREIGN PATENT DOCUMENTS

FR     3067478      12/2018
JP     2015-174541  10/2015
(Continued)

OTHER PUBLICATIONS

Asami et al., Automatic Drive Vehicle . . . , 2018, WO 2018230720 A1 (Year: 2018).*
(Continued)

*Primary Examiner* — Naomi J Small
(74) *Attorney, Agent, or Firm* — Greenblum and Bernstein, P.L.C.

(57) ABSTRACT

A moving body is configured to perform autonomous operation. The moving body includes: a first body including at least one wheel and configured to travel by the at least one wheel; a second body attachable to and detachable from the first body; and a display circuit arranged to face an outer side of the first body. The display circuit is configured to display at least a first schematic pattern of a first eye and a second schematic pattern of a second eye.

20 Claims, 26 Drawing Sheets

FIRST SHAPE

(30) Foreign Application Priority Data

Jan. 24, 2019 (JP) ................................. 2019-010520
Sep. 20, 2019 (JP) ................................. 2019-172123

(51) Int. Cl.
  *B62D 24/00* (2006.01)
  *B62D 27/06* (2006.01)
  *G05D 1/00* (2006.01)

(52) U.S. Cl.
  CPC ............ *B60Q 1/549* (2022.05); *B62D 24/00* (2013.01); *B62D 27/06* (2013.01); *B60Q 1/543* (2022.05); *G05D 1/021* (2013.01)

(58) Field of Classification Search
  USPC ......................................................... 340/944
  See application file for complete search history.

(56) References Cited

U.S. PATENT DOCUMENTS

| | | | |
|---|---|---|---|
| 2009/0016820 A1* | 1/2009 | Baber | E02B 3/068 405/2 |
| 2015/0258928 A1 | 9/2015 | Goto et al. | |
| 2016/0167648 A1 | 6/2016 | James et al. | |
| 2017/0229053 A1 | 8/2017 | Ishizuka et al. | |
| 2017/0243490 A1 | 8/2017 | Leppanen et al. | |
| 2018/0174460 A1* | 6/2018 | Jung | G08G 1/16 |
| 2018/0345777 A1* | 12/2018 | Birnschein | B60W 10/08 |
| 2018/0345971 A1 | 12/2018 | Birnschein et al. | |
| 2020/0104881 A1 | 4/2020 | Yasui et al. | |
| 2020/0104964 A1 | 4/2020 | Yasui et al. | |
| 2020/0126419 A1 | 4/2020 | Yasui et al. | |
| 2020/0159251 A1 | 5/2020 | Iwasaki et al. | |
| 2020/0169705 A1 | 5/2020 | Iwasaki et al. | |
| 2020/0197791 A1 | 6/2020 | Iwasaki et al. | |
| 2020/0207419 A1 | 7/2020 | Iwasaki et al. | |
| 2020/0209011 A1 | 7/2020 | Iwasaki et al. | |
| 2020/0312213 A1 | 10/2020 | Ishizuka et al. | |
| 2021/0150656 A1 | 5/2021 | Yasui et al. | |

FOREIGN PATENT DOCUMENTS

| | | | |
|---|---|---|---|
| JP | 2016-005932 | 1/2016 | |
| JP | 2016-113138 | 6/2016 | |
| JP | 2016-213777 | 12/2016 | |
| JP | 2017-140929 | 8/2017 | |
| JP | 2017-527490 | 9/2017 | |
| JP | 2018-177044 | 11/2018 | |
| WO | 2018/230720 | 12/2018 | |
| WO | WO-2018230720 A1 * | 12/2018 | ........... B60R 16/023 |

OTHER PUBLICATIONS

International Search Report (ISR) from International Searching Authority (Japan Patent Office) in International Pat. Appl. No. PCT/JP2020/002619, dated Mar. 17, 2020, along with an English language translation.

Written opinion (WO) from International Searching Authority (Japan Patent Office) in International Pat. Appl. No. PCT/JP2020/002619, dated Mar. 17, 2020, along with an English language translation.

Panasonic Corporation, "Panasonic Debuts SPACe_C: A Scalable eMobility Concept", https://news.panasonic.com/global/press/data/2019/01/en190108-2/en190108-2.pdf, Jan. 8, 2019.

"Eye Contact with Pedestrians with Big eyes, Jaguar Land Rover's Autonomous Driving Test Vehicle", https://response.jp/article/img/2018/08/29/313445/1333472.html?from-tpthm, Aug. 29, 2018.

Panasonic Corporation, "The Cross-Value Innovation Forum 2018 is Being Held to Celebrate 100 Years of Panasonic" and "General Exhibition | Cross-Value Innovation Forum 2018", https://news.panasonic.com/global/stories/2018/62583.html, https://photos.google.com/share/AF1QipMk-21OIjG868Af4H_iU5TeTsC6Ir_2ykasRGqkQqbp5t1Cw6w2chO-uC_Bstd9H.A?key=Q2RBVC1NaG5ub0EyZmJBSUdZUWs3U1RnTEhPU2JR, Oct. 30, 2018.

Hervé C., "The Qubi Domestic Robot Between Security Guard and Vacuum Cleaner", *available at* https://blog.domadoo.fr/70785-ces2018-robot-domestique-qubi-entre-vigile-aspirateur/ (Jan. 30, 2018), together with an English language translation.

Computex V, "[2018 Best Choice Golden Award] EQL—EQL Qubi Robot", *available at* https://www.youtube.com/watch?v=-IEx019PP7I (May 30, 2018).

* cited by examiner

FIRST SHAPE

SECOND SHAPE

THIRD SHAPE

FOURTH SHAPE

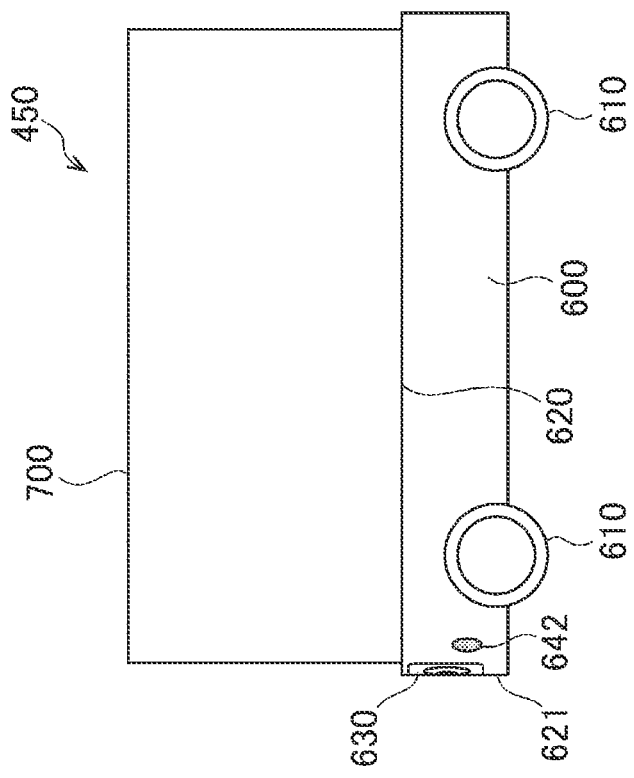
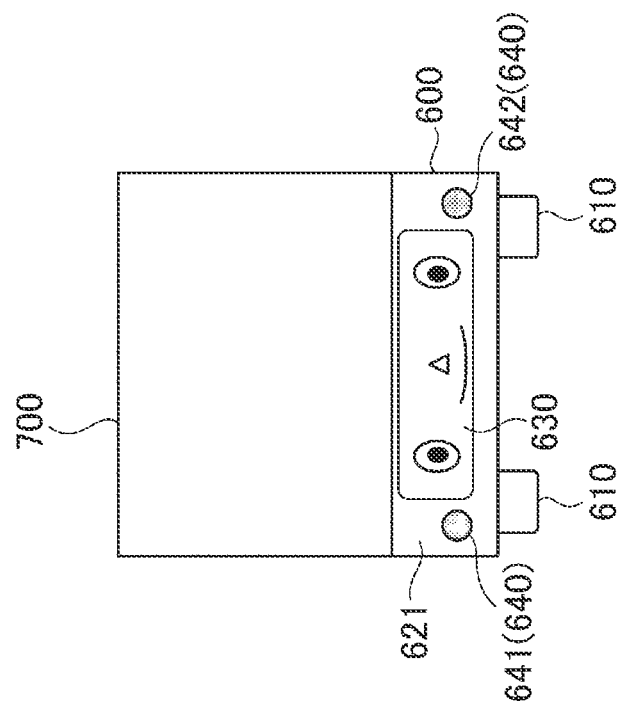

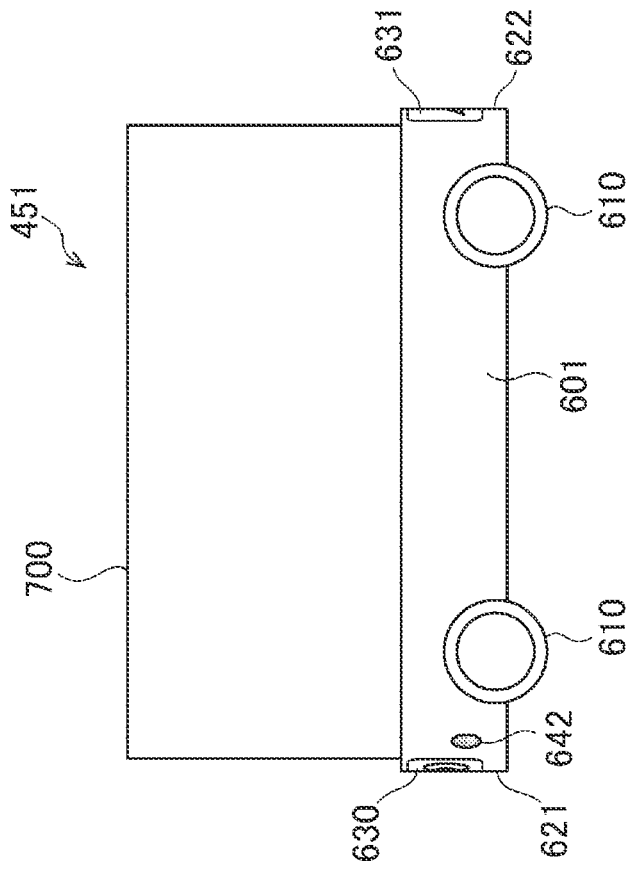
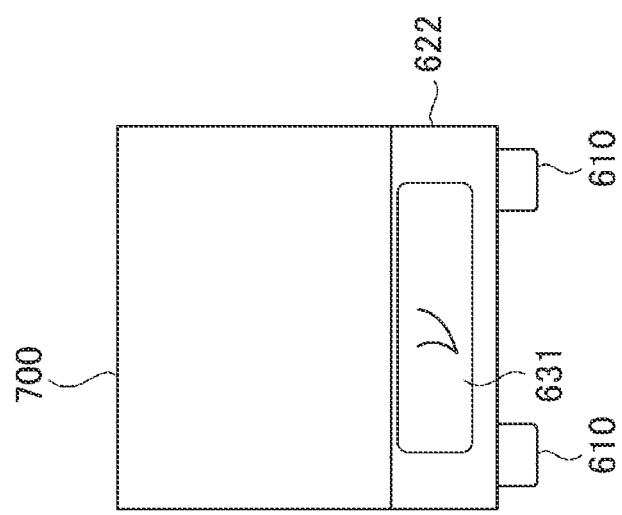

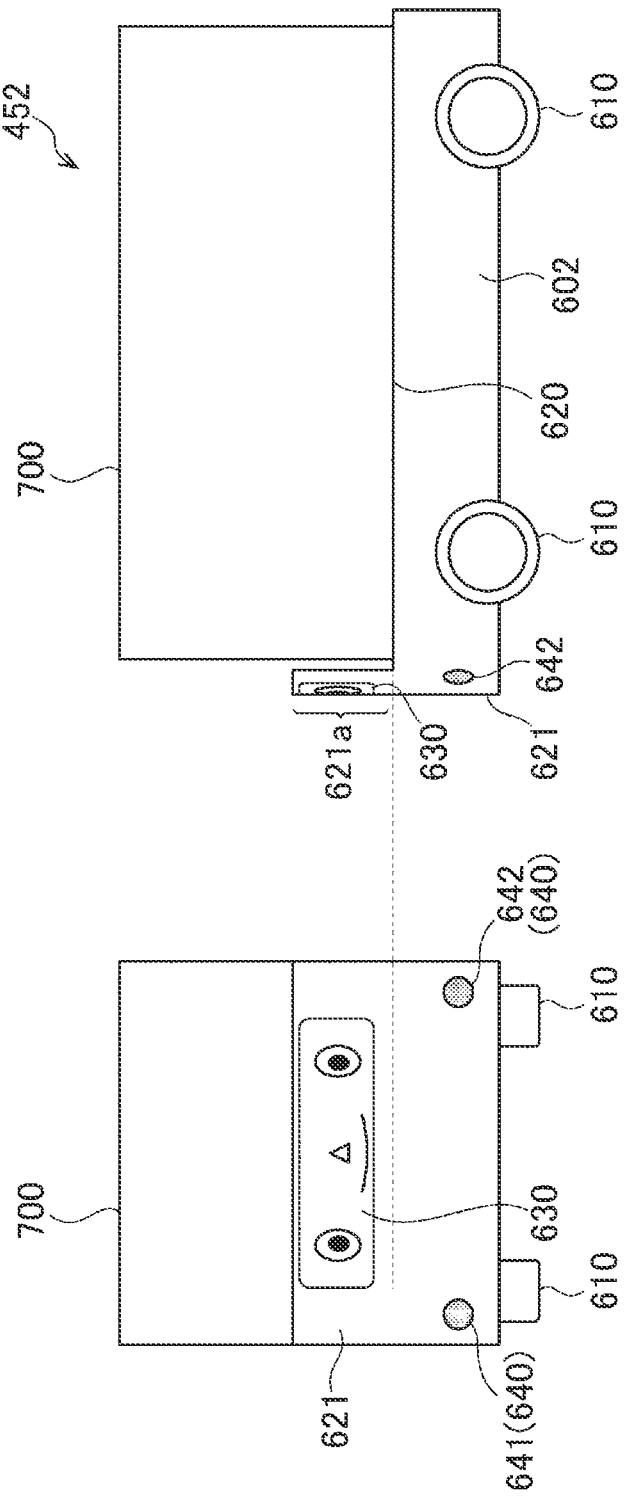

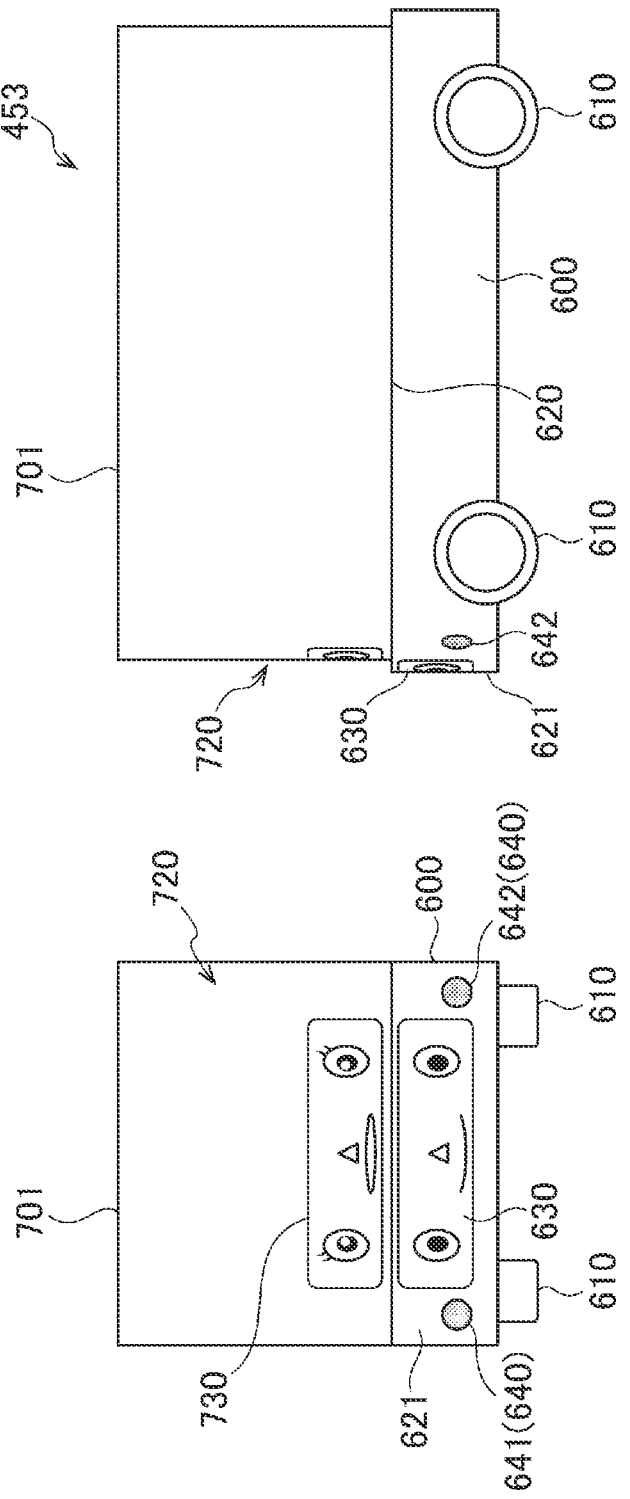

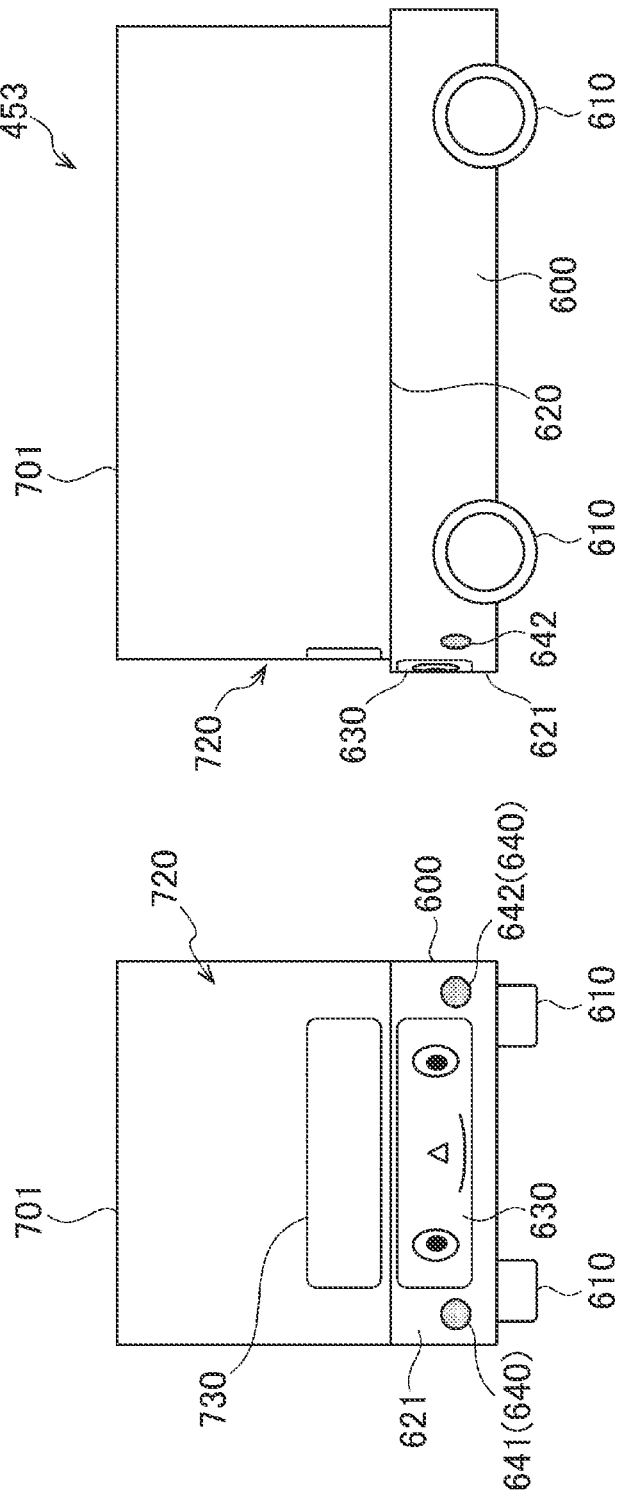

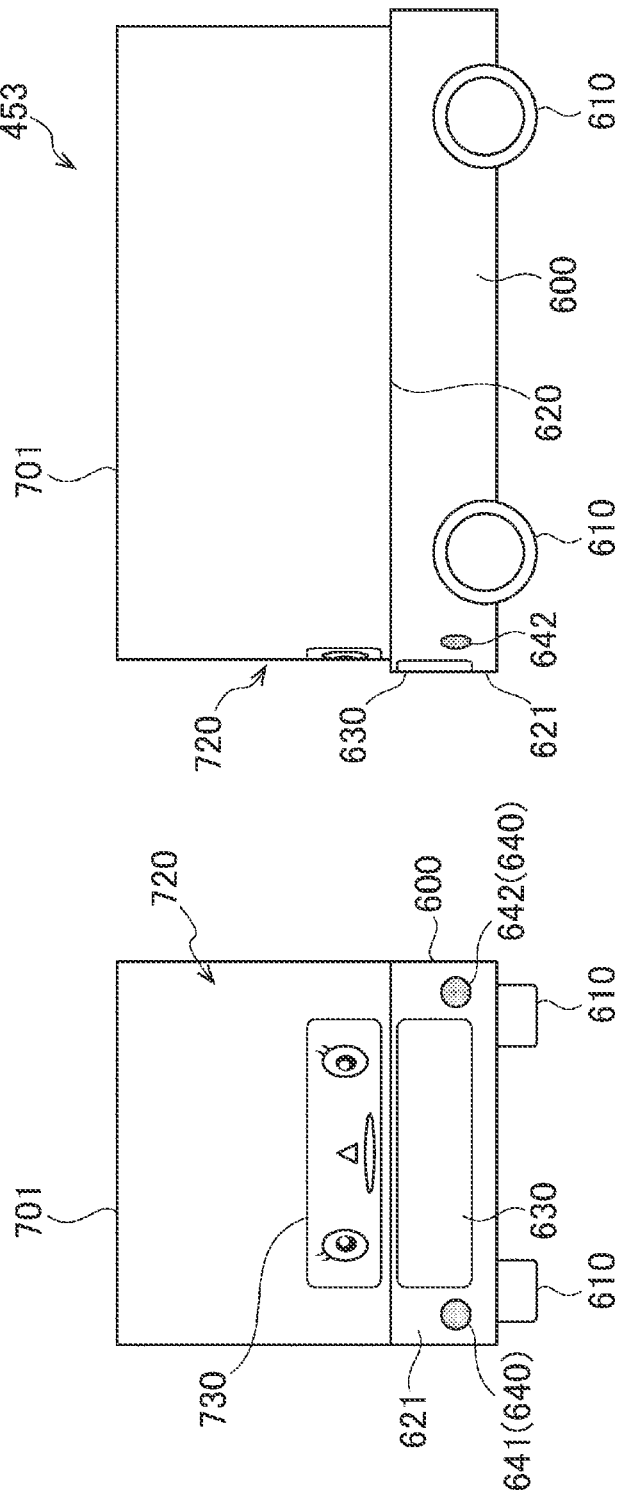

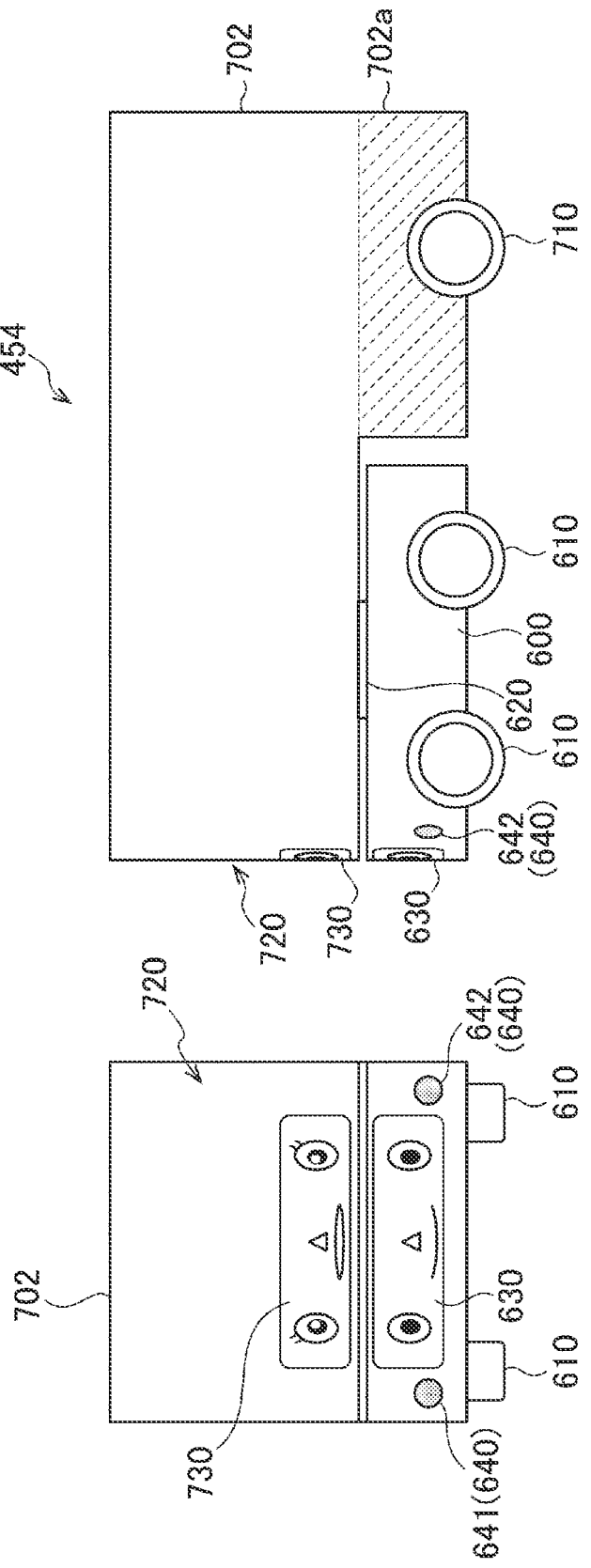

MOVING BODY

CROSS-REFERENCE TO RELATED APPLICATIONS

This application is a continuation of PCT International Patent Application No. PCT/JP2020/002619 filed on Jan. 24, 2020, which claims the benefit of priority of Japanese Patent Application No. 2019-010518 filed on Jan. 24, 2019, Japanese Patent Application No. 2019-010519 filed on Jan. 24, 2019, Japanese Patent Application No. 2019-010520 filed on Jan. 24, 2019 and Japanese Patent Application No. 2019-172123 filed on Sep. 20, 2019, the entire contents of which are incorporated herein by reference.

STATEMENT REGARDING PRIOR DISCLOSURES BY THE INVENTOR OR A JOINT INVENTOR

Under 37 CFR § 1.77(b)(6), Applicant hereby designates the following as grace period inventor disclosures:
  A vehicle exhibited by Panasonic Corporation in: The Panasonic 100th Anniversary comprehensive exhibition "Cross-Value Innovation Forum 2018" held in Tokyo, JAPAN at Tokyo International Forum from Oct. 30, 2018 to Nov. 3, 2018; and
  A vehicle exhibited by Panasonic Corporation at CES® 2019 held in Las Vegas, Nevada, USA from Jan. 8, 2019 to Jan. 11, 2019.

The above disclosures: (1) were made one year or less before the effective filing date of the claimed invention; (2) name an inventor or joint inventors as an author or an inventor; and (3) does not name additional persons as authors on a printed publication or joint inventors on a patent.

FIELD

The present disclosure relates to a moving body that is capable of moving using, for example, a wheel.

BACKGROUND ART

In recent years, research and development of autonomous vehicles have been actively conducted all over the world. Some autonomous vehicles are personalized or converted into a character so as to be capable of eye contact with a pedestrian, a person riding on a bicycle, and the like. For example, in an autonomous vehicle disclosed in "Eye Contact with Pedestrians with Big Eyes, Jaguar Land Rover's Autonomous Driving Test Vehicle," [online], Aug. 29, 2018, Response, [searched on Jul. 29, 2019], Internet URL: https://response.jp/article/img/2018/08/29/313445/1333472.html?from=tpthm (as used herein, "the article in Response"), personification is achieved by providing two large eyes on a front surface thereof and moving each of the eyes.

In addition to personification or character conversion, for example, like an autonomous vehicle disclosed in US Patent Application Publication No. 2016/0167648 or U.S. Pat. No. 9,196,164, there is an autonomous vehicle in which a display is provided toward an outside of the vehicle and a message indicating safe pass being possible for a pedestrian, a person riding on a bicycle, and the like is written in English thereon.

Although not limited to the autonomous vehicle, there is also a technique in which a camera that captures an image of a rear side of an own vehicle is provided, and an image of a following vehicle captured in a rear-side image captured by the camera is personalized or converted into a character and displayed on a display (for example, a display of a car navigation system) of a driver's seat of the own vehicle (for example, see JP-A-2016-213777).

SUMMARY

In the autonomous vehicle disclosed in the article in Response described above, eye contact is made possible by left and right eyes having a three-dimensional shape and a mechanism for moving each of the left and right eyes, but such a configuration is expensive. In addition, in such a configuration, if an attempt is made to make the eye expression rich, such as one achieved when closing the eyes or smiling, it becomes complicated in terms of mechanism and it becomes more expensive. In addition, as in the autonomous vehicle disclosed in the article in Response, the mechanism for moving the left and right eyes may be provided only at a front end of a vehicle body (body) in an autonomous vehicle whose front and rear sides are predetermined. But in an autonomous vehicle whose front and rear sides are not predetermined and whose front side is determined on a forward side in a traveling direction, the mechanism is provided at both ends of a body thereof, which is more expensive than in the case where the mechanism is provided at only one end.

In addition, as in the case of the autonomous vehicle disclosed in US Patent Application Publication No. 2016/0167648 or U.S. Pat. No. 9,196,164, when safe pass being possible is written in a specific language, there is a problem that the message is not transmitted to a person who cannot understand the language, such as a traveler.

An object of the present disclosure is to provide a moving body having eyes that are capable of eye contact with a rich expression and can be configured at a low cost.

The present disclosure provides a moving body configured to perform autonomous operation, and the moving body including: a first body including at least one wheel and configured to travel by the at least one wheel; a second body attachable to and detachable from the first body; and a display circuit arranged to face an outer side of the first body, wherein the display circuit is configured to display at least a first schematic pattern of a first eye and a second schematic pattern of a second eye.

BRIEF DESCRIPTION OF DRAWINGS

FIGS. 10A and 10B are a front view and a side view, respectively, illustrating an external appearance of an autonomous commuter of a moving body management system according to [2] of the first embodiment.

FIGS. 11A and 11B are a rear view and a side view, respectively, illustrating an external appearance of an autonomous commuter including a second display circuit in the moving body management system according to [2] of the first embodiment.

FIGS. 12A and 12B are a front view and a side view, respectively, illustrating an external appearance of a modification [2] of a bogie of the moving body management system according to [2] of the first embodiment.

FIGS. 16A and 16B are a front view and a side view, respectively, illustrating an external appearance of a modification [1] of a container of the moving body management system according to [2] of the first embodiment.

FIGS. 17A and 17B are a front view and a side view, respectively, illustrating a state in which a first schematic pattern and a second schematic pattern are displayed on the first display circuit and a third schematic pattern and a fourth schematic pattern are not displayed on a third display circuit in modification [1] of the container in the moving body management system according to [2] of the first embodiment.

FIGS. 18A and 18B are a front view and a side view, respectively, illustrating a state in which a first schematic pattern and a second schematic pattern are not displayed on the first display circuit and a third schematic pattern and a fourth schematic pattern are displayed on the third display circuit in modification [1] of the container in the moving body management system according to [2] of the first embodiment.

FIGS. 19A and 19B are a front view and a side view, respectively, illustrating an external appearance of modification [2] of the container in the moving body management system according to [2] of the first embodiment.

DETAILED DESCRIPTION

Hereinafter, a moving body management system according to an embodiment of the present disclosure (hereinafter, referred to as "the present embodiment") will be specifically described in detail with reference to the drawings as appropriate. An unnecessarily detailed description may be omitted. For example, a detailed description of a well-known matter or a repeated description of substantially the same configuration may be omitted. This is to avoid unnecessary redundancy in the following description and to facilitate understanding of those skilled in the art. It should be noted that the accompanying drawings and the following description are provided for a thorough understanding of the present disclosure by those skilled in the art, and are not intended to limit the subject matter recited in the claims.

Hereinafter, preferred embodiments for carrying out the present disclosure will be described in detail with reference to the drawings.

[1] of First Embodiment

Figure 1:
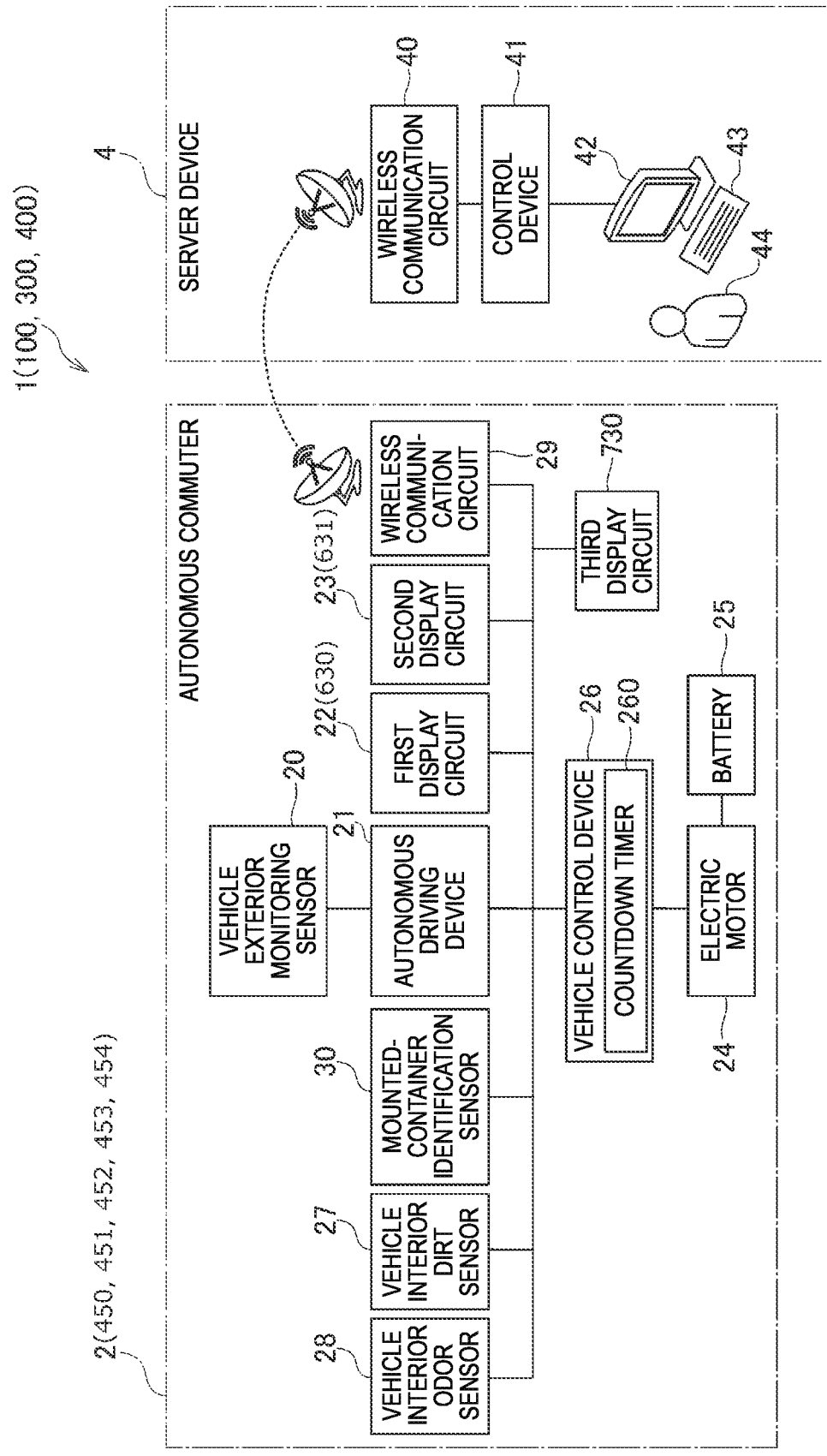
FIG. 1 is a block diagram illustrating a schematic configuration of a moving body management system according to [1] of a first embodiment.

Hereinafter, a moving body management system 1 according to [1] of a first embodiment will be described with reference to the drawings. FIG. 1 is a block diagram illustrating a schematic configuration of the moving body management system 1 according to [1] of the first embodiment. In FIG. 1, the moving body management system 1 of the present embodiment includes an autonomous commuter 2 and a server device 4. The autonomous commuter 2 is a moving body that operates autonomously.

Figure 2:
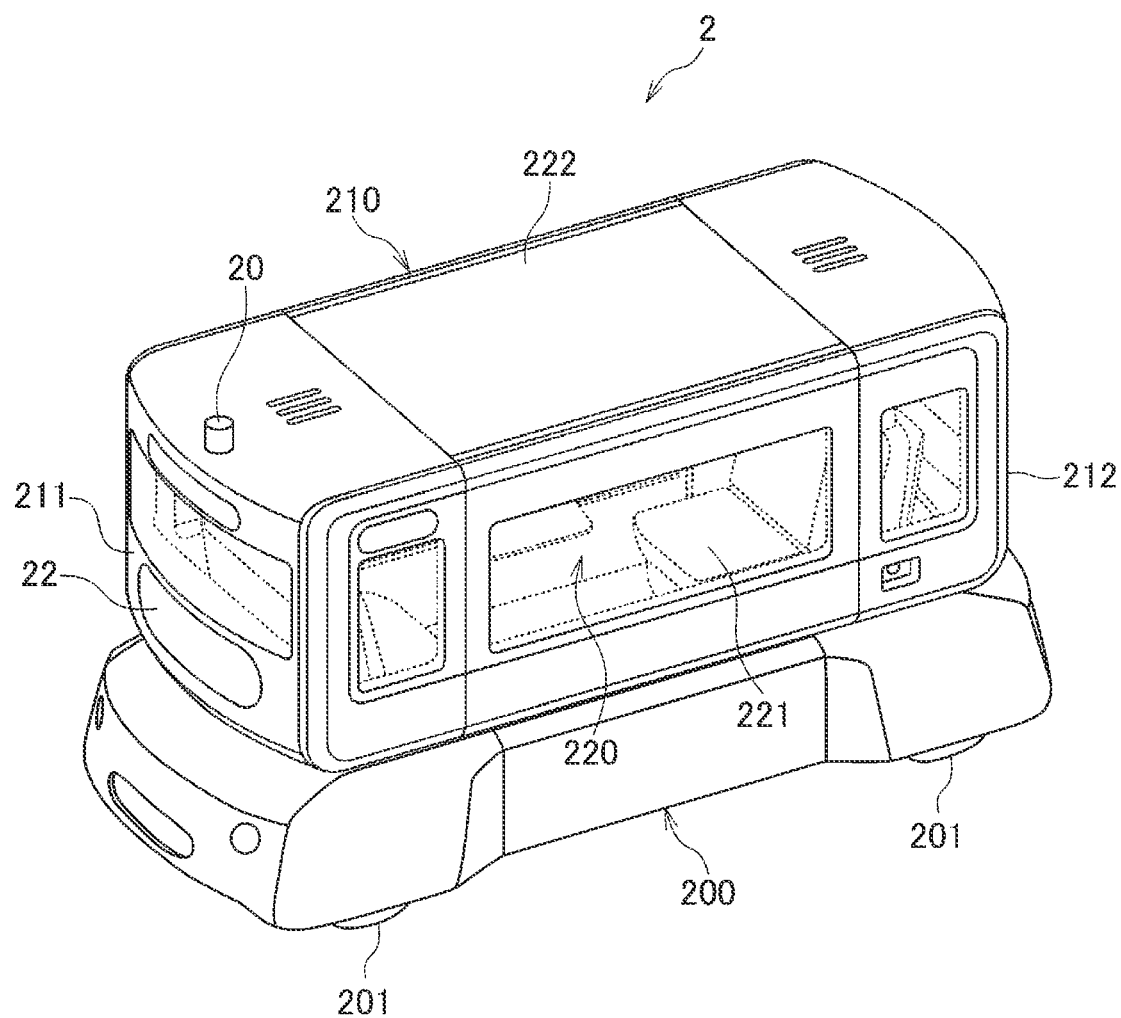
FIG. 2 is a perspective view illustrating an external appearance of an autonomous commuter of the moving body management system of FIG. 1.

FIG. 2 is a perspective view illustrating an external appearance of the autonomous commuter 2. As illustrated in FIG. 2, the autonomous commuter 2 includes a bogie 200 having four wheels 201 (although only two wheels 201 can be seen in FIG. 2, there are actually four wheels), and a container (corresponding to a body) 210 supported by the bogie 200. The container 210 includes, in an inner portion, a riding area 220 to allow a passenger to ride therein, and a seat 221 on which a passenger can sit is disposed in the riding area 220. In addition, the container 210 includes a roof part 222 that covers the riding area 220.

The container 210 is provided with a vehicle exterior monitoring sensor 20, a first display circuit 22, a second display circuit 23, a vehicle interior dirt sensor 27, and a vehicle interior odor sensor 28 (see FIG. 1). The vehicle exterior monitoring sensor 20 is directed toward an outer side of the container 210 of the autonomous commuter 2, is disposed on the roof part 222 at an end portion in a predetermined traveling direction, and monitors a front side in the predetermined traveling direction. As the vehicle exterior monitoring sensor 20, for example, a camera or a light detection and ranging (LIDAR) is used. The first display circuit 22 and the second display circuit 23 display an eye or an animal tail. Details of display of the first display circuit 22 and the second display circuit 23 will be described later.

The vehicle interior dirt sensor 27 is disposed in the container 210 of the autonomous commuter 2, and detects predetermined dirt of the riding area 220 of the container 210. The vehicle interior dirt sensor 27 is, for example, a camera capable of imaging at least a part of the riding area 220. The vehicle interior odor sensor 28 is disposed in the container 210 of the autonomous commuter 2, and detects an odor of an atmosphere in the riding area 220 of the container 210. Details of an operation based on a result of detecting dirt and odor in the container 210 will be described later.

On the other hand, as illustrated in FIG. 1, the bogie 200 is provided with an autonomous driving device 21, an electric motor 24, a battery 25, a vehicle control device 26, a wireless communication circuit 29, and a mounted-container identification sensor 30. The mounted-container identification sensor 30 is disposed on the side of the bogie 200 that supports the container 210, and performs container identification. Details of an operation based on a result of performing container identification will be described later. The autonomous driving device 21 performs control for autonomous traveling using a sensor signal output from the vehicle exterior monitoring sensor 20. The electric motor 24 drives the wheels of the bogie 200. Electric power from the battery 25 is supplied to the electric motor 24.

The vehicle control device 26 monitors whether a state of the autonomous driving device 21 is normal or abnormal. An example in which the autonomous driving device 21 is normal is a state where a predetermined process ends within a predetermined time, and an example in which the autonomous driving device 21 is abnormal is a state where the predetermined process remains even when the predetermined time elapses (a hang-up state).

In addition to monitoring normality/abnormality of the autonomous driving device 21, the vehicle control device 26 performs control related to display of the first display circuit 22 and the second display circuit 23, control over the electric motor 24, control over the wireless communication circuit 29, acquisition of a sensor signal from the vehicle interior dirt sensor 27, acquisition of a sensor signal from the vehicle interior odor sensor 28, and acquisition of a sensor signal from the mounted-container identification sensor 30. The vehicle control device 26 also includes a countdown timer 260 used in the control related to the display of the first display circuit 22 and the second display circuit 23. The vehicle control device 26 includes a central processing unit (CPU), a read only memory (ROM) that stores a program for controlling the CPU, and a random access memory (RAM) that is used for operating the CPU (none is shown).

The wireless communication circuit 29 performs wireless communication with the server device 4. For this wireless communication, a dedicated frequency band, a frequency band for moving body communication, or the like is used.

Here, the display of the first display circuit 22 and the second display circuit 23 will be described.

As illustrated in FIG. 2, the first display circuit 22 is directed toward the outer side of the container 210 of the autonomous commuter 2, and is disposed at one end portion 211 in the traveling direction (corresponding to the "predetermined traveling direction") of the autonomous commuter 2. The first display circuit 22 includes a display such as a micro light emitting diode (LED), an liquid crystal display (LCD), or an organic electro luminescence (EL), and displays a figure such as a line, a circle, and an ellipse.

The second display circuit 23 is directed toward the outer side of the container 210 of the autonomous commuter 2, and is disposed at the other end portion 212 opposite to the one end portion 211 in the traveling direction (predetermined traveling direction) of the autonomous commuter 2. Similarly to the first display circuit 22, the second display circuit 23 includes a display such as a micro LED, an LCD, or an organic EL, and displays a figure such as a line, a circle, or an ellipse. The display control over the first display circuit 22 and the second display circuit 23 is performed by the vehicle control device 26.

The control over the first display circuit 22 and the second display circuit 23 will be described.

Figure 3A:
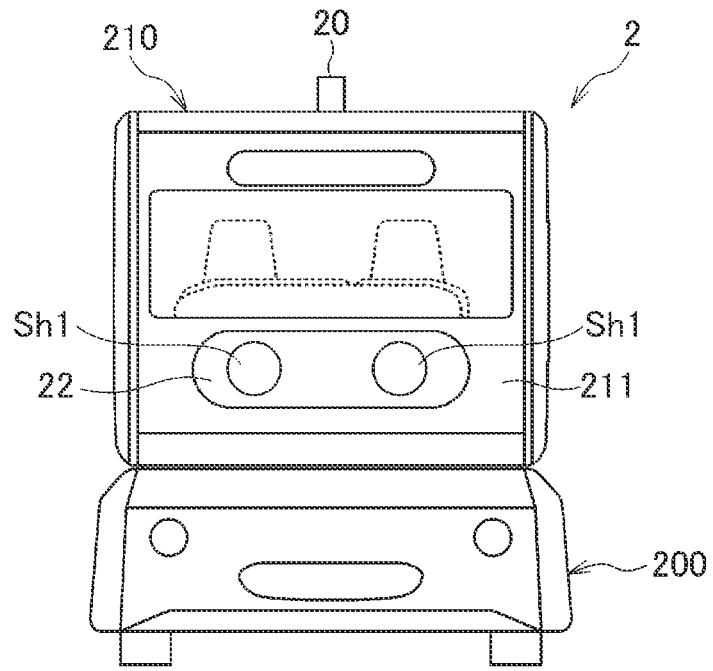
FIGS. 3A and 3B are diagrams illustrating an example of a shape of a first schematic pattern of a first eye and a shape of a second schematic pattern of a second eye displayed by a first display circuit of the autonomous commuter of FIG. 2.
Figure 3B:
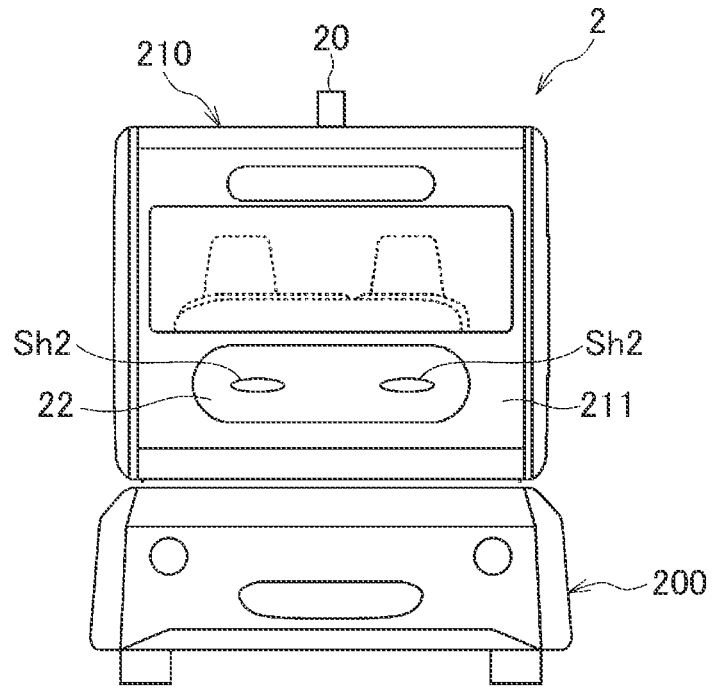

As described above, the control over the first display circuit 22 and the second display circuit 23 are performed by the vehicle control device 26. FIGS. 3A and 3B are diagrams illustrating an example of a shape of a first schematic pattern of a first eye and a shape of a second schematic pattern of a second eye displayed by the first display circuit 22. FIG. 3A illustrates an example of a first shape Sh1 of the first schematic pattern of the first eye and the first shape Sh1 of a second schematic pattern of the second eye, and FIG. 3B illustrates an example of a second shape Sh2 of the first schematic pattern of the first eye and the second shape Sh2 of the second schematic pattern of the second eye. The first schematic pattern of the first eye is a pattern on a left side in the drawing, and the second schematic pattern of the second eye is a pattern on a right side in the drawing. As illustrated in FIG. 3A, the first shape Sh1 of the first schematic pattern of the first eye and the first shape Sh1 of the second schematic pattern of the second eye both have a circular shape. Further, as illustrated in FIG. 3B, the second shape Sh2 of the first schematic pattern of the first eye and the second shape Sh2 of the second schematic pattern of the second eye both have an elliptical shape. Area of the first shape Sh1 is larger than area of the second shape Sh2, and the first shape Sh1 corresponds to a state where the eyes are open, and the second shape Sh2 corresponds to a state where the eyes are closed. The eyes shown in the first shape Sh1 and the second shape Sh2 may be points or circles, or may be what similar to the eyes as pupils.

In the first schematic pattern of the first eye and the second schematic pattern of the second eye that are displayed by the first display circuit 22, when an autonomous operation of the autonomous commuter 2 is in a predetermined state (that is, in a normal state), the first schematic pattern of the first eye and the second schematic pattern of the second eye perform a predetermined blink at a predetermined time interval. In this case, it is assumed that the predetermined blink is not a wink and is performed simultaneously by the first schematic pattern of the first eye and the second schematic pattern of the second eye. In addition, with respect to the predetermined blinks of the first schematic pattern of the first eye and the second schematic pattern of the second eye being simultaneously performed, it is sufficient that the predetermined blinks are at least partially overlapped with each other in a time axis, and blinking motions may not be completely overlapped with each other from the start to the end.

On the other hand, when the autonomous operation of the autonomous commuter 2 is not in the predetermined state (that is, not in a normal state), the first schematic pattern of the first eye and the second schematic pattern of the second eye do not perform the predetermined blink. When the autonomous operation of the autonomous commuter 2 is not in the predetermined state, the first schematic pattern of the first eye and the second schematic pattern of the second eye may not be displayed.

As described above, in the first display circuit 22, by changing the first shape Sh1 of the first and second schematic patterns to the second shape Sh2 of the first and second schematic patterns and changing the second shape Sh2 of the first and second schematic patterns to the first shape Sh1 of the first and second schematic patterns, it is possible to give an expression of being blinking. In addition, since the first display circuit 22 displays the eyes on a display device such as a micro LED, an LCD, or an organic EL, it is possible to reduce the cost as compared with a case where the eyes are mechanically implemented.

In the autonomous commuter 2, in addition to implementing a blink by the first shape Sh1 of the first and second schematic patterns of the first and second eyes and the second shape Sh2 of the first and second schematic patterns of the first and second eyes, it is possible to change a line of sight. By changing the line of sight, it is possible to make eye contact with a pedestrian and a person riding on a bicycle moving in front of the autonomous commuter 2 in the traveling direction.

Here, line-of-sight control in the autonomous commuter 2 will be described.

Figure 4:
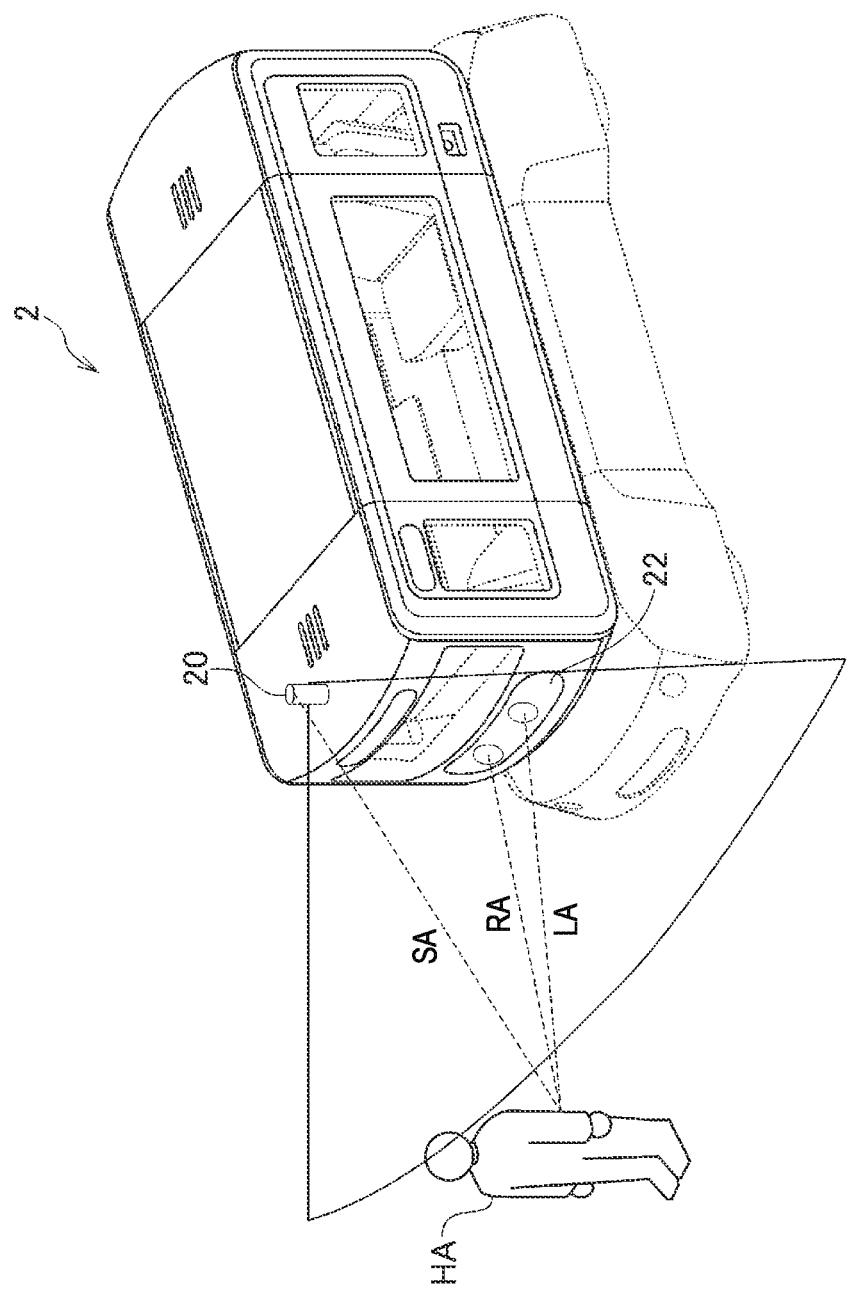
FIG. 4 is a diagram for illustrating line-of-sight control in the autonomous commuter of FIG. 2.
Figure 5A:
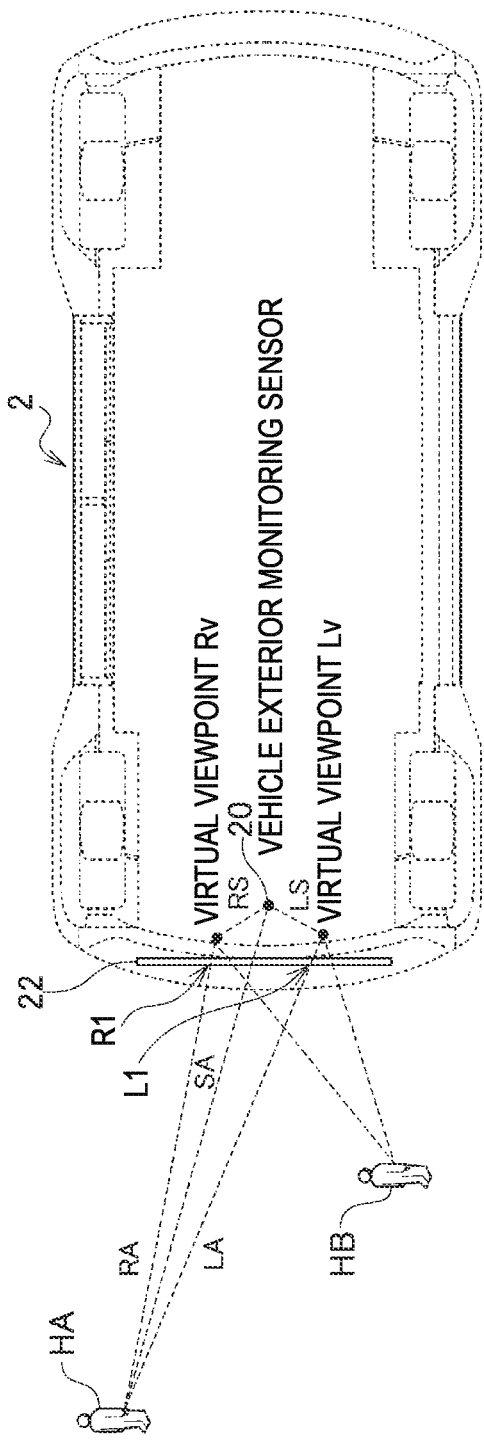
FIGS. 5A and 5B are diagrams for illustrating the line-of-sight control in the autonomous commuter of FIG. 2.
Figure 5B:
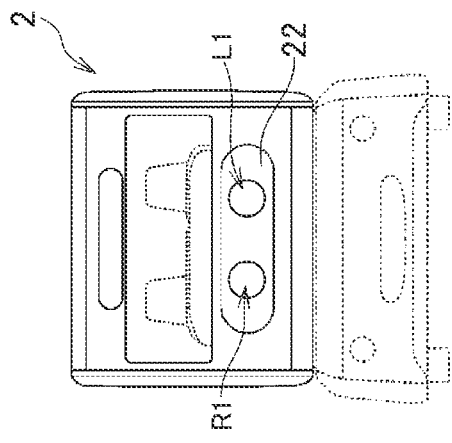

FIG. 4 and FIGS. 5A and 5B are diagrams for illustrating the line-of-sight control in the autonomous commuter 2. FIG. 5A is a view of the autonomous commuter 2 as viewed from above, and FIG. 5B is a view of the autonomous commuter 2 as viewed from the front. In FIG. 4 and FIGS. 5A and 5B, virtual viewpoints Lv and Rv are provided in advance inside the autonomous commuter 2. The virtual viewpoints Lv and Rv are on a back side of display positions L1 and R1 of the eyes in the first display circuit 22 when there is no monitoring target outside the vehicle. For example, it is assumed that the back side is 10 cm to 20 cm from the display positions L1 and R1 of the eyes. Since the virtual viewpoints Lv and Rv are virtual points for calculating the display positions L1 and R1 of the eyes, entities are not required at positions of the virtual viewpoints Lv and Rv. When vectors LS and RS corresponding to relative positions of the vehicle exterior monitoring sensor 20 with respect to the virtual viewpoints Lv and Rv are subtracted from a vector SA to a person HA outside the vehicle detected by the vehicle exterior monitoring sensor 20, vectors LA and RA connecting the virtual viewpoints Lv and Rv are obtained. Intersection points (that is, the display positions L1 and R1) with the vectors LA and RA can be easily obtained by calculation. When a circle having the first shape centered on each of the intersection points (that is, the display positions L1 and R1) is displayed, an eye directed toward the person HA outside the vehicle is implemented.

Since the vehicle exterior monitoring sensor 20 can detect not only a relative direction of the person HA outside the vehicle but also a distance and a height thereof, the vectors LA and RA are three-dimensional, and positions of the intersection points (that is, the display positions L1 and R1) can be changed not only in a left-right direction but also in an up-down direction toward a direction of the target. The intersection points (that is, the display positions L1 and R1) are sequentially updated on the first display circuit 22 in accordance with a detection result of the vehicle exterior monitoring sensor 20, so that it is possible to show that a line of sight changes. In a case where a plurality of monitoring targets including a person HB outside the vehicle are detected in addition to the person HA outside the vehicle, the intersection points (that is, the display positions L1 and R1) are configured to look at the person HA outside the vehicle and the person HB outside the vehicle, for example, in a time-division manner at an interval of several seconds. Accordingly, the line of sight can be directed to a plurality of monitoring targets. In a case where the control is abnormal, a reaction may not be shown to a person outside the vehicle as in a case where there is no monitoring target outside the vehicle.

Next, the second display circuit 23 will be described.

The second display circuit 23 is also controlled by the vehicle control device 26. The second display circuit 23 displays a schematic pattern simulating a tail of an animal (for example, a cat) when the autonomous operation of the autonomous commuter 2 is in a predetermined state, that is, a normal state, and does not display the schematic pattern simulating a tail when the autonomous operation of the autonomous commuter 2 is not in the predetermined state, that is, a normal state. When the autonomous operation of the autonomous commuter 2 is not in the predetermined state, the schematic pattern of a tail may not be displayed.

Here, in the autonomous commuter 2 of the moving body management system 1 of the present embodiment, there is no distinction between front and rear, and a front side in the traveling direction defines a front portion and an opposite side defines a rear portion. Therefore, when a side on which the first display circuit 22 is provided defines the front portion, a schematic pattern of the eyes is displayed on the first display circuit 22, and a schematic pattern of the tail is displayed on the second display circuit 23. Conversely, when a side on which the second display circuit 23 is provided defines the front portion, a schematic pattern of the eyes is displayed on the second display circuit 23, and a schematic pattern of the tail is displayed on the first display circuit 22. As described above, since the first display circuit 22 and the second display circuit 23 display the same schematic pattern, shapes at the time when the schematic patterns of the first and second eyes are displayed are referred to as the first shape and the second shape, and shapes at the time when the schematic patterns of the tail is displayed are referred to as a third shape and a fourth shape.

Figure 6A:
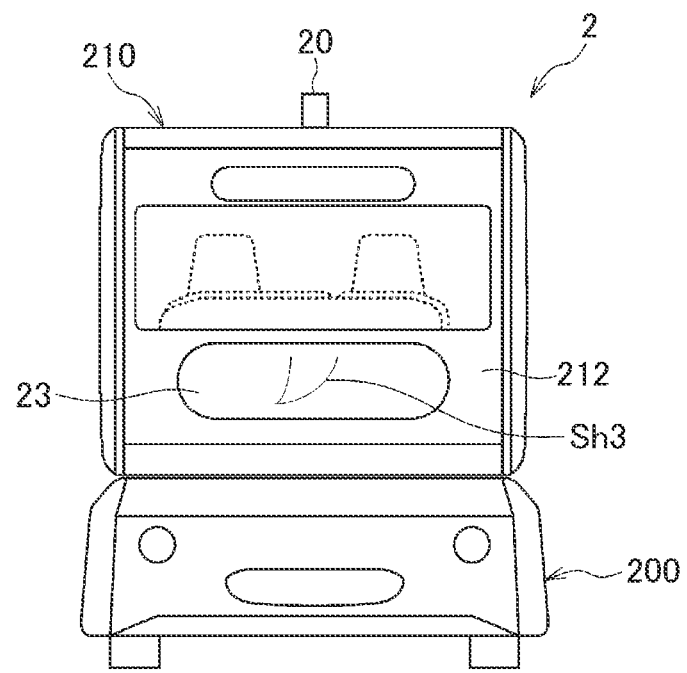
FIGS. 6A and 6B are diagrams illustrating an example of a third shape and a fourth shape of an animal tail displayed by a second display circuit of the autonomous commuter of FIG. 2.
Figure 6B:
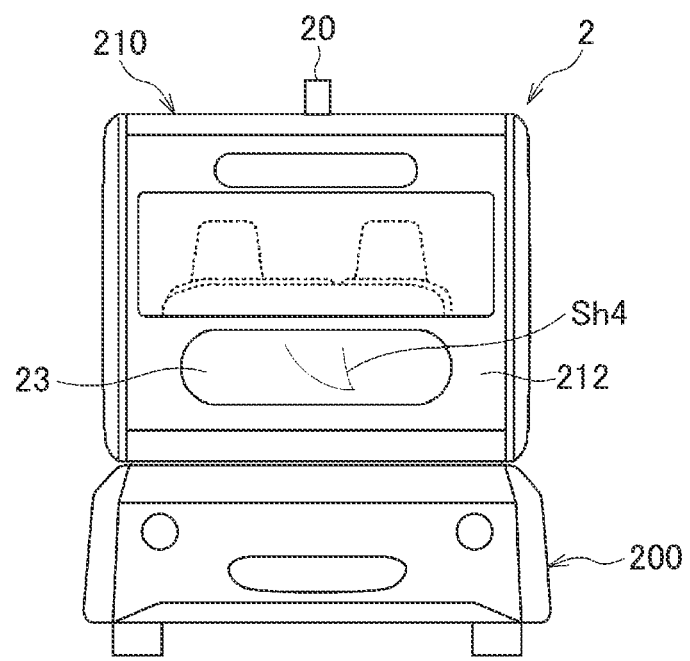

FIGS. 6A and 6B are diagrams illustrating an example of the third shape and the fourth shape of a schematic pattern of an animal tail. A third shape Sh3 illustrated in FIG. 6A is a shape at the time when a tip of the tail is directed to the left. In addition, a fourth shape Sh4 illustrated in FIG. 6B is a shape at the time when the tip of the tail is directed to the right. By changing from the third shape Sh3 to the fourth shape Sh4 and changing from the fourth shape Sh4 to the third shape Sh3 in the schematic pattern of the tail, it is possible to show a seemingly wagging tail. The operation of tail wagging is performed when the autonomous operation of the autonomous commuter 2 is normal, and is not performed when the autonomous operation is not normal. Since the second display circuit 23 displays the tail, the cost can be reduced as compared with a case where the tail is mechanically implemented, for example.

Next, the server device 4 will be described.

In FIG. 1, the server device 4 includes the wireless communication circuit (communication circuit) 40, a control device 41, a display (display circuit or display device) 42, and an input device (input circuit) 43. The wireless communication circuit 40 performs bidirectional communication with the wireless communication circuit 29 of the autonomous commuter 2. The control device 41 includes a CPU, a ROM that stores a program for controlling the CPU, and a RAM used for an operation of the CPU (none is shown), and controls the wireless communication circuit 40 and the display 42 in accordance with data and a control signal input from the input device 43. Examples of the input device 43 include a keyboard and a mouse. It is needless to say that the input device 43 is operated by an operator 44.

Next, an operation of the moving body management system 1 of the present embodiment will be described.

Figure 7:
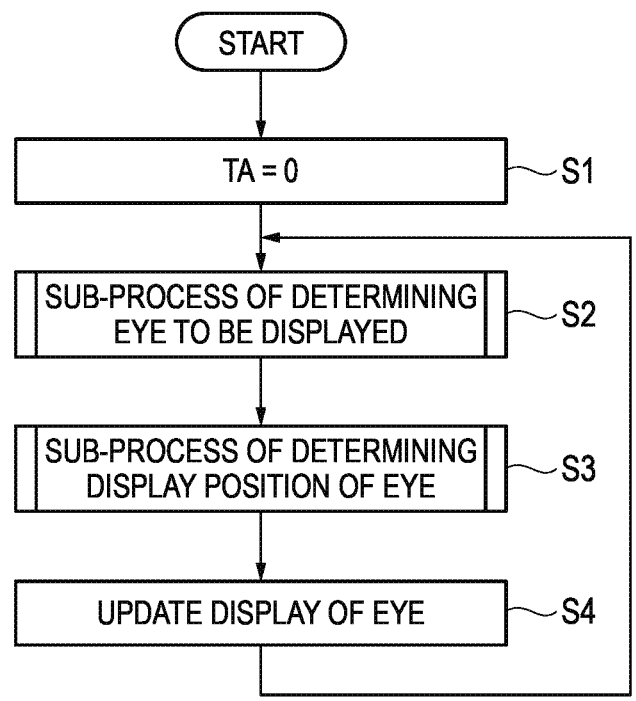
FIG. 7 is a flowchart for illustrating a main process for blinking by the first display circuit of the autonomous commuter of FIG. 2.
Figure 8:
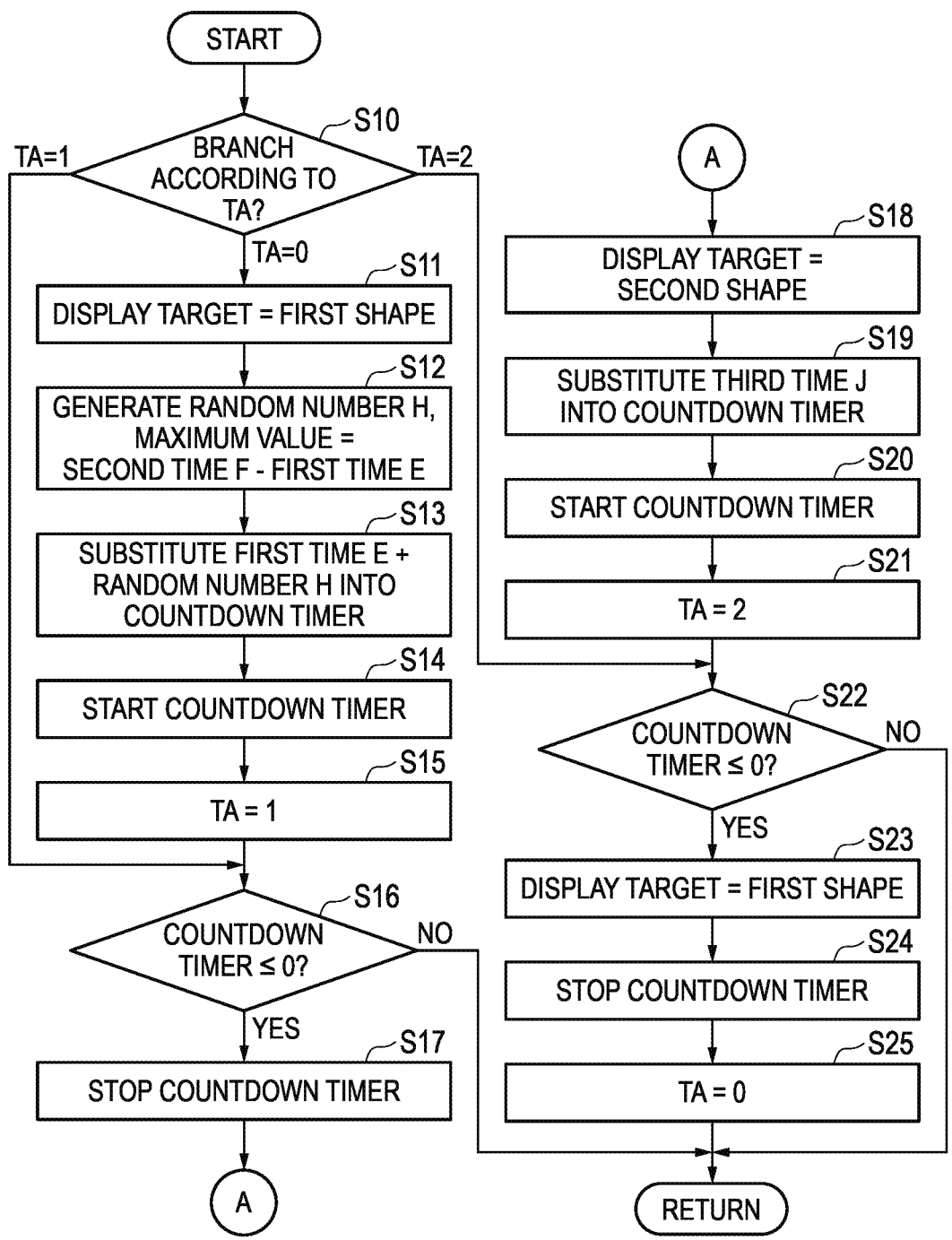
FIG. 8 is a flowchart for illustrating a sub-process for determining an eye to be displayed in the main process of FIG. 7.
Figure 9:
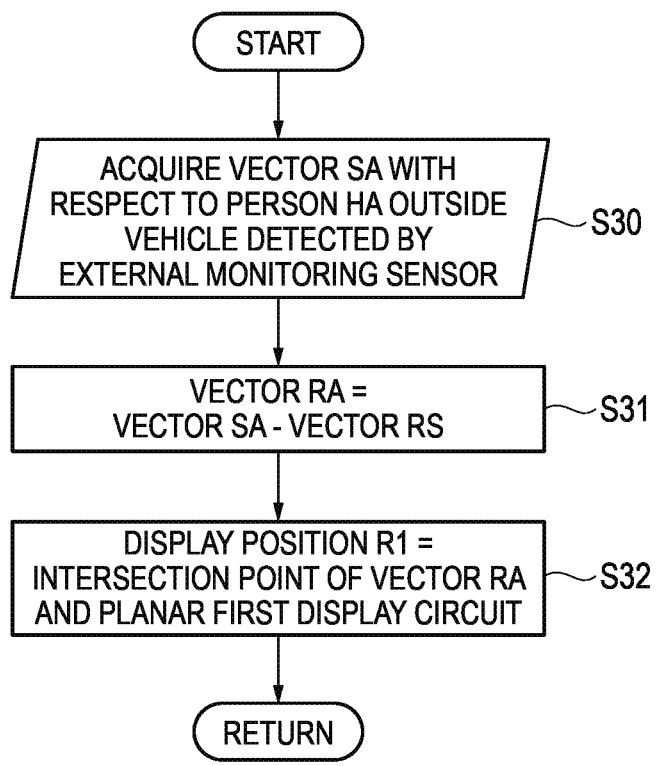
FIG. 9 is a flowchart for illustrating a sub-process for determining a display position of an eye in the main process of FIG. 7.

FIG. 7 is a flowchart for illustrating a main process for blinking in the first display circuit 22. FIG. 8 is a flowchart for illustrating a sub-process for determining an eye to be displayed. FIG. 9 is a flowchart for illustrating a sub-process for determining a display position of an eye.

A flag TA shown in FIGS. 7 and 8 determines an operation state, and details thereof are as follows.

TA=0: a state before a display target is set to the first shape (a reset state starts from here)

TA=1: a state in which the display target is set to the first shape and the countdown timer 260 is operated until switching to TA=2

TA=2: a state in which the display target is set to the second shape and the countdown timer 260 is operated until switching to the first shape Although a subject of the operation is a CPU (not shown) of the vehicle control device 26, the vehicle control device 26 is taken as a subject in the following description.

In FIG. 7, the vehicle control device 26 first sets the flag TA to "0" (step S1). Thereafter, a sub-process for determining an eye to be displayed is executed (step S2). Details of this sub-process will be described later. After the sub-process is executed and the eye to be displayed is determined, a sub-process for determining a display position of the eye is executed (step S3). Details of this sub-process will be described later. After the sub-process is executed and the display position of the eye is determined, display of the eye is updated (step S4).

In FIG. 8, the vehicle control device 26 determines which value among "0", "1", and "2" a value of the flag TA is (step S10), and proceeds to step S11 when it is determined that TA=0, proceeds to step S16 when it is determined that TA=1, and proceeds to step S22 when it is determined that TA=2. First, when it is determined that TA=0 and the process proceeds to step S11, the display target is set to the first shape. That is, as illustrated in of FIG. 3A, the eyes are set to an open state. After setting the display target to the first shape, the vehicle control device 26 generates a random number H having a time (a second time F−a first time E) obtained by subtracting the first time E from the second time F as a maximum value (step S12), adds the random number H to the first time E, and substitutes a value (the first time E+the random number H) into the countdown timer 260 (step S13). After setting an addition value of the first time E and the random number H in the countdown timer 260, the vehicle control device 26 causes countdown to start in the countdown timer 260 (step S14).

After starting the countdown in the countdown timer 260, the vehicle control device 26 updates the value of the flag TA to "1" (step S15). Next, it is determined whether a value of the countdown timer 260 is equal to or less than 0 (zero) (step S16), and when it is determined that the value is not equal to or less than 0 (zero) (when "NO" is determined in step S16), the process returns to the main process. On the other hand, when it is determined that the value of the countdown timer 260 is equal to or less than 0 (zero) (when "YES" is determined in step S16), an operation of the countdown timer 260 is stopped (step S17).

After stopping the operation of the countdown timer 260, the vehicle control device 26 sets the display target to the second shape (step S18). That is, as illustrated in FIG. 3B, the eyes are set to a closed state. Next, a third time J is substituted into the countdown timer 260 (step S19). Then, countdown is started in the countdown timer 260 (step S20). After starting the countdown in the countdown timer 260, the vehicle control device 26 updates the value of the flag TA to "2" (step S21). Next, it is determined whether the value of the countdown timer 260 is equal to or less than 0 (zero) (step S22), and when it is determined that the value is not equal to or less than 0 (zero) (when "NO" is determined in step S22), the process returns to the main process. On the other hand, when it is determined that the value of the countdown timer 260 is equal to or less than 0 (zero) (when "YES" is determined in step S22), the display target is set to the first shape (step S23). That is, as illustrated in FIG. 3A, the eyes are set to an open state. After setting the display target to the first shape, the vehicle control device 26 stops the operation of the countdown timer 260 (step S24), updates the value of the flag TA to "0" (step S25) thereafter, and returns the process to the main process.

In FIG. 9, the vehicle control device 26 obtains a vector SA with respect to the person HA outside the vehicle detected by the vehicle exterior monitoring sensor 20, based on a sensor signal from the vehicle exterior monitoring sensor 20 (step S30). After obtaining the vector SA with respect to the person HA outside the vehicle, the vehicle control device 26 obtains a vector RA by subtracting a vector RS from the vector SA (step S31). After obtaining the vector RA, the vehicle control device 26 determines a display position R1 (step S32). That is, an intersection point of the vector RA and the planar first display circuit 22 is determined (the intersection point is the display position R1). After the display position R1 is determined, the vehicle control device 26 returns the process to the main process.

As described above, the autonomous commuter (moving body) 2 constituting the moving body management system 1 according to [1] of the first embodiment includes the first display circuit 22 that is directed toward the outer side of the container (body) 210 mounted on the bogie 20, that is disposed at the one end portion 211 in the predetermined traveling direction and that includes a display such as a micro LED. When the autonomous operation of the autonomous commuter 2 is in a normal state, the first schematic pattern of the first eye and the second schematic pattern of the second eye are displayed on the first display circuit 22, and the respective shapes are alternately changed, at a predetermined time interval, to the first shape in which the eyes are opened and the second shape in which the eyes are closed so as to give an expression of being blinking. Thus, it is possible to make eye contact with a pedestrian, a person riding on a bicycle, and the like moving in front of the autonomous commuter 2 in the traveling direction. In addition, since the first display circuit 22 using a display such as a micro LED is provided, the cost can be reduced as compared with a case where the eyes are mechanically implemented.

In addition, the autonomous commuter 2 includes the second display circuit 23 that is directed toward the outer side of the container 200, that is disposed on the other end portion 212 opposite to the one end portion 211 in the predetermined traveling direction, and that includes a display such as a micro LED. When the autonomous operation of the autonomous commuter 2 is in a normal state, a schematic pattern simulating a tail of an animal is displayed on the second display circuit 23, and the third shape in which a tip of the tail is directed to the left and a fourth shape in which the tip of the tail is directed to the right are alternately changed to show a wagging tail. Thus, it is possible to make the autonomous commuter 2 agreeable to a pedestrian, a person riding on a bicycle, and the like moving behind the autonomous commuter 2 in the traveling direction.

In addition, since the second display circuit 23 using a display such as a micro LED is provided, the cost can be reduced as compared with a case where the tail is mechanically implemented.

Although the autonomous commuter 2 of the moving body management system 1 of the present embodiment has four wheels, the number of wheels is not limited. For example, the autonomous commuter 2 may have one wheel.

In addition, although the autonomous commuter 2 of the moving body management system 1 of the present embodiment includes the roof part 222, the autonomous commuter 2 may be an open type without a roof part.

[2] of First Embodiment

Next, a moving body management system according to [2] of the first embodiment will be described.

The moving body management system of the present embodiment includes an autonomous commuter and a server device, similarly to the moving body management system 1 according to [1] of the first embodiment described above. Since the autonomous commuter of the moving body management system of the present embodiment has substantially the same configuration as the autonomous commuter 2 of the moving body management system 1 according to [1] of the first embodiment, FIG. 1 will be referred to when necessary in the description. Further, since the server device has the same configuration as the server device 4 of the moving body management system 1 according to [1] of the first embodiment, FIG. 1 will be referred to when necessary in the description.

Here, a reference numeral 400 is assigned to the moving body management system of the present embodiment, and a reference numeral 450 is assigned to the autonomous commuter constituting the moving body management system 400.

A main difference between the autonomous commuter 450 of the moving body management system 400 of the present embodiment and the autonomous commuter 2 of the moving body management system 1 according to [1] of the first embodiment described above is that: a display circuit for displaying a pseudo eye or the like is provided on the container side in the autonomous commuter 2 of the moving body management system 1 according to [1] of the first embodiment, whereas the display circuit is provided on the bogie side in the autonomous commuter 450 of the moving body management system 400 of the present embodiment. By providing the display circuit on the bogie side, it is possible to omit provision on the container side, and in such a case, it is possible to obtain an advantage that a degree of freedom in container design is increased and that a human machine interface (HMI) can be unified regardless of presence or absence of a container. Details of the display circuit in the autonomous commuter 450 of the moving body management system 400 of the present embodiment will be described below. There are many differences in addition to the difference in the position where the display circuit is provided, which will be described later.

FIGS. 10A and 10B are a front view and a side view, respectively, illustrating an external appearance of the autonomous commuter 450 of the moving body management system 400 of the present embodiment. In this case, FIG. 10A is a front view, and FIG. 10B is a side view. As illustrated in FIGS. 10A and 10B, the autonomous commuter 450 is a moving body that operates autonomously, and includes a bogie (first body) 600 including four wheels 610 (although only two wheels 610 are seen in FIGS. 10A and 10B, there are actually four wheels), and a container (second body) 700 supported by the bogie 600. The autonomous commuter 450 can travel in a predetermined traveling direction. Here, with respect to the predetermined traveling direction, when the autonomous commuter 450 is switched between "forward traveling" and "backward traveling", a corresponding traveling direction is the predetermined traveling direction.

The bogie 600 is formed in a rectangular box shape, and the wheels 610 described above are disposed at four corners, respectively, so that the bogie 600 can travel on the ground by the wheels 610. An upper surface of the bogie 600 is a flat support surface 620 that supports the container 700. The container 700 has a rectangular box shape in which a length in a vertical direction (that is, a height) is longer than a length in the vertical direction (that is, a height) of the bogie 600, and a length in a horizontal direction (that is, a length corresponding to the traveling direction of the autonomous commuter 450) is slightly shorter than a length in the horizontal direction (that is, a length corresponding to the traveling direction of the autonomous commuter 450) of the bogie 600.

The container 700 is detachably placed on the support surface 620 of the bogie 600. For example, if the container 700 is to carry a person, the container 700 is provided, in an inner portion, with a riding area to allow a passenger to ride therein, and a seat on which the passenger can sit is disposed in the riding area. In addition, the container 700 has a roof part that covers the riding area.

The bogie 600 is provided with a display circuit (first display circuit) 630 capable of making eye contact with a pedestrian, a person riding on a bicycle, or another autonomous commuter. The display circuit 630 is directed toward an outer side of the bogie 600 and is disposed at an end portion 621 in a forward traveling direction of the autonomous commuter 450. The display circuit 630 includes a display such as a micro LED, an LCD, or an organic EL, similarly to the first display circuit 22 (or the second display circuit 23) of the autonomous commuter 2 of the moving body management system 1 according to [1] of the first embodiment described above.

The display circuit 630 displays a first schematic pattern of a first eye and a second schematic pattern of a second eye. The display circuit 630 is controlled by the vehicle control device 26 (see FIG. 1). For example, when an autonomous operation of the autonomous commuter 450 is in a normal state, the vehicle control device 26 displays the first schematic pattern of the first eye and the second schematic pattern of the second eye on the display circuit 630, and alternately changes, at a predetermined time interval, shapes thereof to a first shape in which the eyes are opened and a second shape in which the eyes are closed so as to appear to be blinking, and thus it is possible to make eye contact with a pedestrian, a person riding on a bicycle, and the like moving in front of the autonomous commuter 450 in the forward traveling direction.

In addition, the bogie 600 is provided with a pair of lights 640 including a first light 641 and a second light 642 for illuminating a front side in the forward traveling direction. The pair of lights 640 is disposed at the end portion 621 of the bogie 600. The first light 641 and the second light 642 are disposed apart from each other, with the display circuit 630 being positioned therebetween. With respect to arrangement of the display circuit 630 between the first light 641 and the second light 642, the entire display circuit 630 may be positioned therebetween, or a part of the display circuit 630 may be positioned therebetween. That is, at least a part of the display circuit 630 may be disposed between the first light 641 and the second light 642. Since the bogie 600 includes the pair of lights 640, the bogie 600 can illuminate the front side in the forward traveling direction, and safety can be secured during nighttime traveling.

As described above, in the autonomous commuter 450 of the moving body management system 400 of the present embodiment, since the display circuit 630 for displaying a pseudo eye or the like is provided on the bogie 600, the provision on the container 700 can be omitted, and accordingly an advantage can be obtained that a degree of freedom in the container design can be increased and that an HMI can be unified regardless of presence or absence of a container.

Although the bogie 600 includes four wheels 610 in the autonomous commuter 450 of the moving body management system 400 of the present embodiment, the number of wheels 610 is not limited, and the bogie 600 may include at least one wheel.

In addition, the bogie 600 may be a bogie (for example, a drone) that includes a propeller and can move while floating in the air by the propeller, instead of moving by the wheels 610.

In addition, in the autonomous commuter 450 of the moving body management system 400 of the present embodiment, the display circuit 630 provided on the bogie 600 is not limited to displaying only the first schematic pattern of the first eye and the second schematic pattern of the second eye, and may display, for example, schematic patterns of a mouth and a nose (in FIGS. 10A and 10B, schematic patterns of a mouth and a nose are displayed).

Next, modifications of the bogie 600 and the container 700 in the autonomous commuter 450 of the moving body management system 400 of the present embodiment will be described.

Modification [1] of Bogie 600

In the autonomous commuter 450 of the moving body management system 400 of the present embodiment, the display circuit 630 is disposed at the end portion (one end portion) 621 of the bogie 600 in the forward traveling direction, and alternatively, the second display circuit may be directed toward the outer side of the bogie 600 and be provided at the other end portion opposite to the end portion 621 in the traveling direction. FIGS. 11A and 11B are a rear view and a side view, respectively, illustrating an external appearance of the autonomous commuter 451 that includes the second display circuit 631 at the other end portion 622 of the bogie 600. In this case, FIG. 11A is a rear view, and FIG. 11B is a side view. As illustrated in FIG. 11A, for example, a schematic pattern simulating a tail of an animal is displayed on the second display circuit 631.

Modification [2] of Bogie 600

FIGS. 12A and 12B show a front view and a side view, respectively, illustrating an external appearance of a modification [2] of the bogie 600. In this case, FIG. 12A is a front view, and FIG. 12B is a side view. As illustrated in FIGS. 12A and 12B, a bogie 602 of an autonomous commuter 452, which is the modification [2] of the bogie 600, includes the support surface 620 capable of supporting at least a part of the container 700, and includes a protruding portion 621*a* that protrudes upward (in the vertical direction) with respect to the support surface 620. In the bogie 602 according to the modification [2], the end portion 621 includes the protruding portion 621*a*. At least a part of the display circuit 630 is disposed on the protruding portion 621*a*. Since the display circuit 630 is disposed on the protruding portion 621*a*, at least a part of the display circuit 630 is disposed above the support surface 620 in the vertical direction. That is, the whole or a part of the display circuit 630 is disposed above the support surface 620 depending on a degree of protrusion of the protruding portion 621*a*.

In the bogie 602 of the modification [2], the pair of lights 640 is disposed below the display circuit 630 in the vertical direction. By disposing the pair of lights 640 below the display circuit 630 in the vertical direction, it is easy to confirm presence of the display circuit 630, and the glare is reduced as compared with a case where the display circuit 630 is disposed between the first light 641 and the second light 642.

Figure 13A:
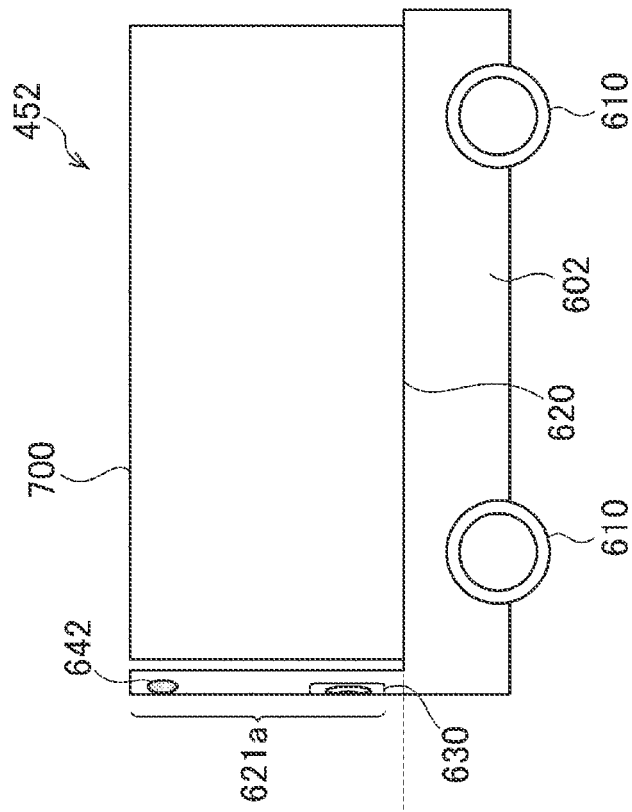
FIGS. 13A and 13B are a front view and a side view, respectively, illustrating an external appearance of an example in which a length of a protruding portion of the bogie of the modification [2] of FIGS. 12A and 12B is extended.
Figure 13B:
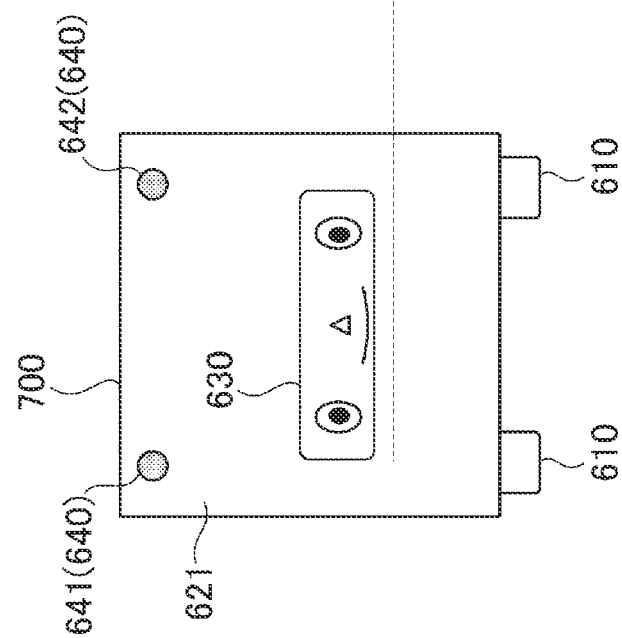

FIGS. 13A and 13B show a front view and a side view, respectively, illustrating an external appearance of an example in which the protruding portion 621*a* has a length such that a tip end thereof is extended to reach a height of the container 700. In this case, FIG. 13A is a front view and FIG. 13B is a side view. Also in the example illustrated in FIGS. 13A and 13B, at least a part of the display circuit 630 is disposed above the support surface 620 in the vertical direction.

In the example illustrated in FIGS. 13A and 13B, the pair of lights 640 is disposed above the display circuit 630 in the vertical direction. By disposing the pair of lights 640 above the display circuit 630 in the vertical direction, it is easy to confirm presence of the display circuit 630, and the glare is reduced as compared with a case where the display circuit 630 is disposed between the first light 641 and the second light 642.

Modification [3] of Bogie 600

Figures 14A, 14B:
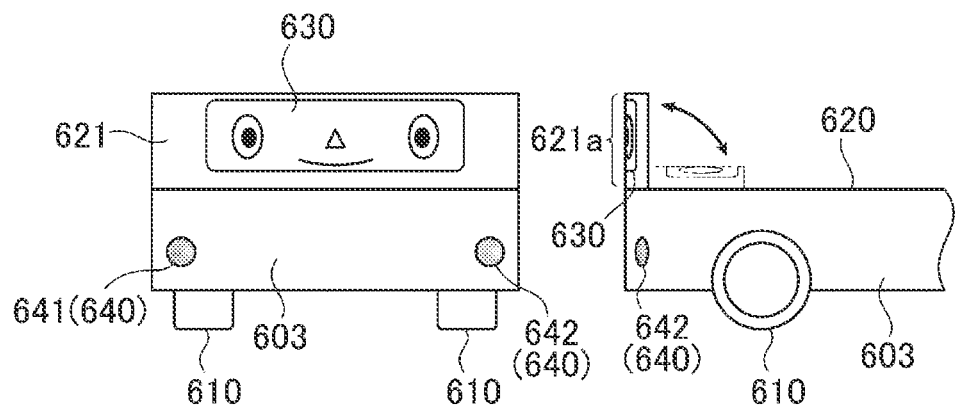
FIGS. 14A and 14B are a front view and a side view, respectively, illustrating an external appearance of a modification [3] of a bogie of the moving body management system according to [2] of the first embodiment.

FIGS. 14A and 14B show a front view and a side view, respectively, illustrating an external appearance of a modification [3] of the bogie 600. In this case, FIG. 14A is a front view and FIG. 14B is a side view. As illustrated in FIGS. 14A and 14B, in a bogie 603 that is the modification [3] of the bogie 600, the protruding portion 621*a* is folded by being laid down. Since the protruding portion 621*a* is made foldable, the display circuit 630 can be protected. For example, the protruding portion 621*a* can be folded when the display circuit 630 is not used, making it possible to avoid an impact from the outside.

Modification [4] of Bogie 600

Figures 15A, 15B:
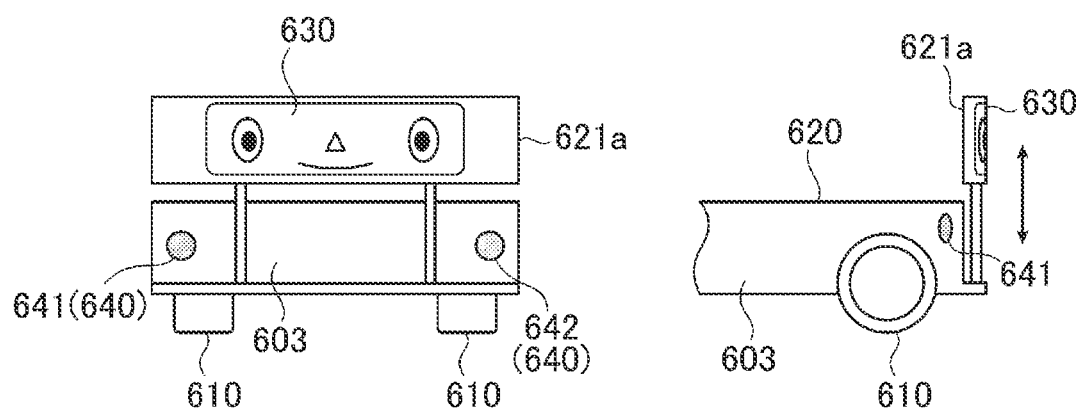
FIGS. 15A and 15B are a front view and a side view, respectively, illustrating an external appearance of a modification [4] of a bogie of the moving body management system [2] of the first embodiment.

FIGS. 15A and 15B show a front view and a side view, respectively, illustrating an external appearance of a modification [4] of the bogie 600. In this case, FIG. 15A is a front view and FIG. 15B is a side view. As illustrated in FIGS. 15A and 15B, in the bogie 603 that is the modification [4] of the bogie 600, the protruding portion 621a is set to extend and contract in an up-down direction so as to be foldable. Also in this modification, the display circuit 630 can be protected. For example, the protruding portion 621a can be folded when the display circuit 630 is not used, making it possible to avoid an impact from the outside.

Modification [1] of Container 700

FIGS. 16A and 16B show a front view and a side view, respectively, illustrating an external appearance of a modification [1] of the container 700. In this case, FIG. 16A is a front view and FIG. 16B is a side view. As illustrated in FIGS. 16A and 16B, a container 701 of an autonomous commuter 453, which is the modification [1] of the container 700, includes a third display circuit 730 at an end portion 720 in a forward traveling direction that is directed toward an outer side of the container 701. The third display circuit 730 can display a third schematic pattern of a third eye and a fourth schematic pattern of a fourth eye. Note that the third display circuit 730 is not limited to displaying only the third schematic pattern of the third eye and the fourth schematic pattern of the fourth eye, and may display, for example, schematic patterns of a mouth and a nose (in FIGS. 16A and 16B, schematic patterns of a mouth and a nose are displayed).

Although a degree of freedom in container design is reduced due to provision of the third display circuit 730 on the container 701, when the container 701 is mounted and used, the third schematic pattern of the third eye and the fourth schematic pattern of the fourth eye have higher display positions on the third display circuit 730, and can be easily seen from a farther place. When the container 701 is used alone, the third display circuit 730 can be used for other applications such as signage. In addition, since there are two display circuits when the container 701 is mounted, various expressions can be achieved by combining the two display circuits. For example, pseudo eyes are displayed on the container 701 side and a mouth and hands are displayed on the bogie 600 side to express a gesture.

The display of the first schematic pattern and the second schematic pattern in the display circuit (first display circuit) 630 of the bogie 600 and the display of the third schematic pattern and the fourth schematic pattern in the third display circuit 730 of the container 701 may be simultaneously performed. The first schematic pattern and the second schematic pattern in the display circuit 630 may be displayed and the third schematic pattern and the fourth schematic pattern in the third display circuit 730 may not be displayed. Alternatively, the first schematic pattern and the second schematic pattern in the display circuit 630 may not be displayed and the third schematic pattern and the fourth schematic pattern in the third display circuit 730 may be displayed.

FIGS. 17A and 17B show a front view and a side view, respectively, illustrating a state in which the first schematic pattern and the second schematic pattern in the display circuit 630 are displayed and the third schematic pattern and the fourth schematic pattern in the third display circuit 730 are not displayed. In this case, FIG. 17A is a front view and FIG. 17B is a side view. FIGS. 18A and 18B show a front view and a side view, respectively, illustrating a state in which the first schematic pattern and the second schematic pattern in the display circuit 630 are not displayed and the third schematic pattern and the fourth schematic pattern in the third display circuit 730 are displayed. In this case, FIG. 18A is a front view and FIG. 18B is a side view.

Modification [2] of Container 700

FIGS. 19A and 19B show a front view and a side view, respectively, illustrating an external appearance of a modification [2] of the container 700. In this case, FIG. 19A is a front view and FIG. 19B is a side view. As illustrated in FIGS. 19A and 19B, a container 702 of an autonomous commuter 454, which is the modification [2] of the container 700, has a length in the traveling direction longer than a length in the traveling direction of the bogie 600, and a part of the container 702 that is supported by the bogie 600 is disposed above the support surface 620 of the bogie 600 in the vertical direction. In this case, a portion 702a of the part of the container 702 deviated from the bogie 600 is disposed below the support surface 620 of the bogie 600 in the vertical direction. The portion 702a of the part of the container 702 deviated from the bogie 600 is provided with wheels 710 (although only one wheel 710 is shown in FIGS. 19A and 19B, there are actually two wheels).

In addition, the container 702 is provided with the third display circuit 730 at an end portion 720 in the traveling direction of the container 702 that is directed toward an outer side of the container 702. The third display circuit 730 can display at least the third schematic pattern of the third eye and the fourth schematic pattern of the fourth eye. Since the third display circuit 730 has a higher ground height than the display circuit (first display circuit) 630 provided in the bogie 600, visibility of the third display circuit 730 by a pedestrian, a person riding on a bicycle, and the like moving in front of the bogie 600 in the traveling direction is improved.

The display of the first schematic pattern and the second schematic pattern by the display circuit 630 and the display of the third schematic pattern and the fourth schematic pattern by the third display circuit 730 may be performed simultaneously, or the display of the first schematic pattern and the second schematic pattern by the display circuit 630 may be performed and the display of the third schematic pattern and the fourth schematic pattern by the third display circuit 730 may not be performed. Conversely, the display of the first schematic pattern and the second schematic pattern by the display circuit 630 may not be performed and the display of the third schematic pattern and the fourth schematic pattern by the third display circuit 730 may be displayed.

Second Embodiment

Next, a moving body management system according to a second embodiment will be described. A moving body management system 100 of the present embodiment corresponds to an autonomous moving vehicle management system.

The moving body management system 100 of the present embodiment has a function of notifying that cleaning is necessary when predetermined dirt in a riding area of the container 210 is detected. Functions other than this function are the same as those of the moving body management system 1 according to [1] of the first embodiment described above. In addition, since a configuration thereof is the same as that of the moving body management system 1 according to [1] of the first embodiment, the block diagram of FIG. 1 is referred to.

Figure 20:
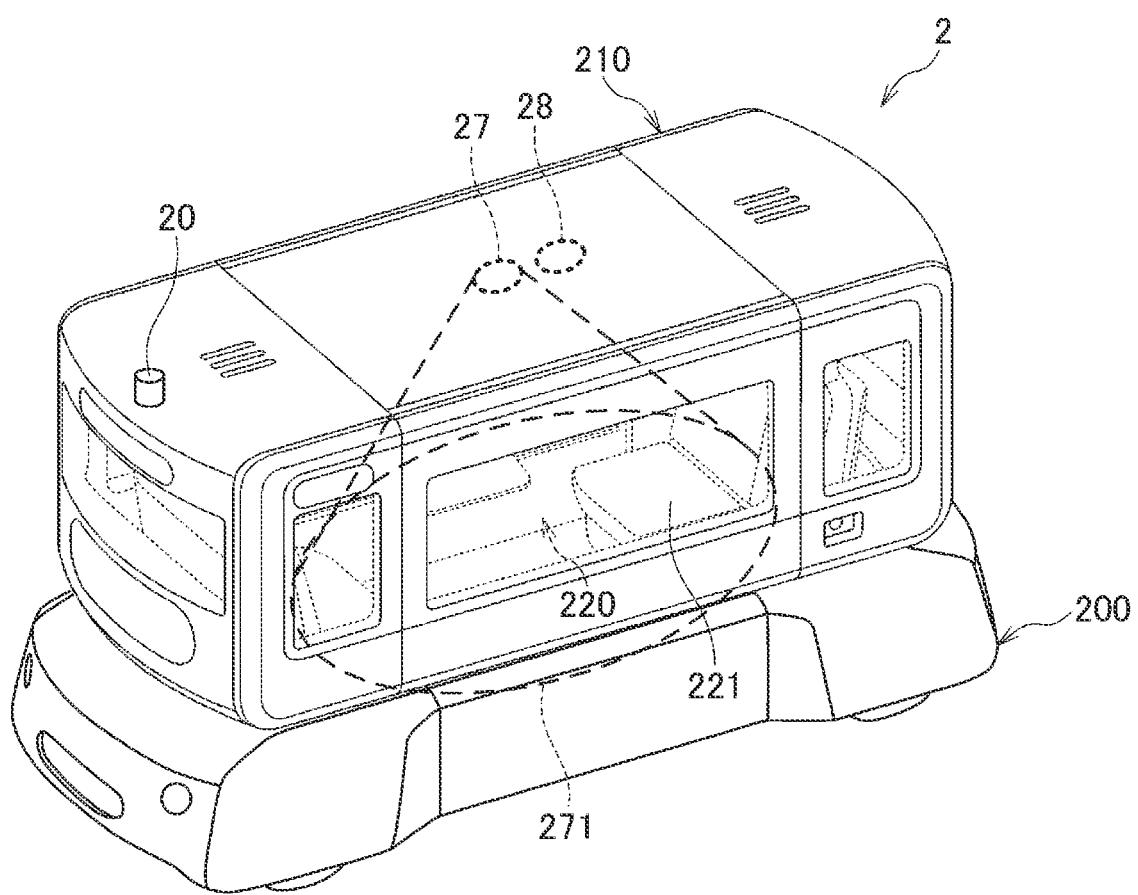
FIG. 20 is a perspective view illustrating an autonomous commuter and an image monitoring range of a vehicle interior dirt sensor in the autonomous commuter, which constitute a moving body management system of a second embodiment.

FIG. 20 is a perspective view illustrating the autonomous commuter (vehicle) 2 and an image monitoring range 271 of the vehicle interior dirt sensor 27 in the autonomous commuter 2, which constitute the moving body management system 100 of the present embodiment. In FIG. 20, the vehicle interior dirt sensor 27 can detect predetermined dirt of the riding area 220 provided in an inner portion of the container 210, and is disposed at a position in the inner portion of the container 210 where the riding area 220 can be monitored. In FIG. 20, the vehicle interior dirt sensor 27 is substantially disposed at a center of a ceiling surface in the inner portion of the container 210. In the inner portion of the container 210, the vehicle interior odor sensor 28 is disposed adjacent to the vehicle interior dirt sensor 27.

When the vehicle interior dirt sensor 27 detects the predetermined dirt in the riding area 220, the vehicle control device 26 of the autonomous commuter 2 transmits information indicating that cleaning is necessary and an image indicating a state of the predetermined dirt in the riding area 220 detected by the vehicle interior dirt sensor 27 to the server device 4. When the control device 41 of the server device 4 receives the information and the image transmitted from the autonomous commuter 2, the control device 41 displays a message indicating that cleaning is necessary on the display 42 and displays a state of the predetermined dirt in the riding area 220.

When the vehicle interior dirt sensor 27 detects the predetermined dirt in the riding area 220 while the autonomous commuter 2 is moving based on a first movement plan, the vehicle control device 26 transmits, to the server device 4, information indicating that a second movement plan including a service station (not shown) is to be proposed, unlike the first movement plan. When the control device 41 of the server device 4 receives the information transmitted from the autonomous commuter 2, the control device 41 performs display, on the display 42, indicating that a second movement plan including a service station is proposed. When the operator 44 performs an operation of adopting the second movement plan with respect to this display, the control device 41 of the server device 4 transmits information indicating that the second movement plan is adopted to the autonomous commuter 2. When the vehicle control device 26 of the autonomous commuter 2 receives the information transmitted from the server device 4, the vehicle control device 26 performs control to start movement based on the second movement plan. It is assumed that a sanitation worker is present in the service station described above, and a location of the service station may be an end point of a route or may be in the middle of the route.

FIG. 21 to FIG. 25 are flowcharts for illustrating operations of the moving body management system 100 of the second embodiment. Although a subject of the operations is the CPU (not shown) of the vehicle control device 26 of the autonomous commuter 2, the vehicle control device 26 is taken as a subject in the description.

Figure 21:
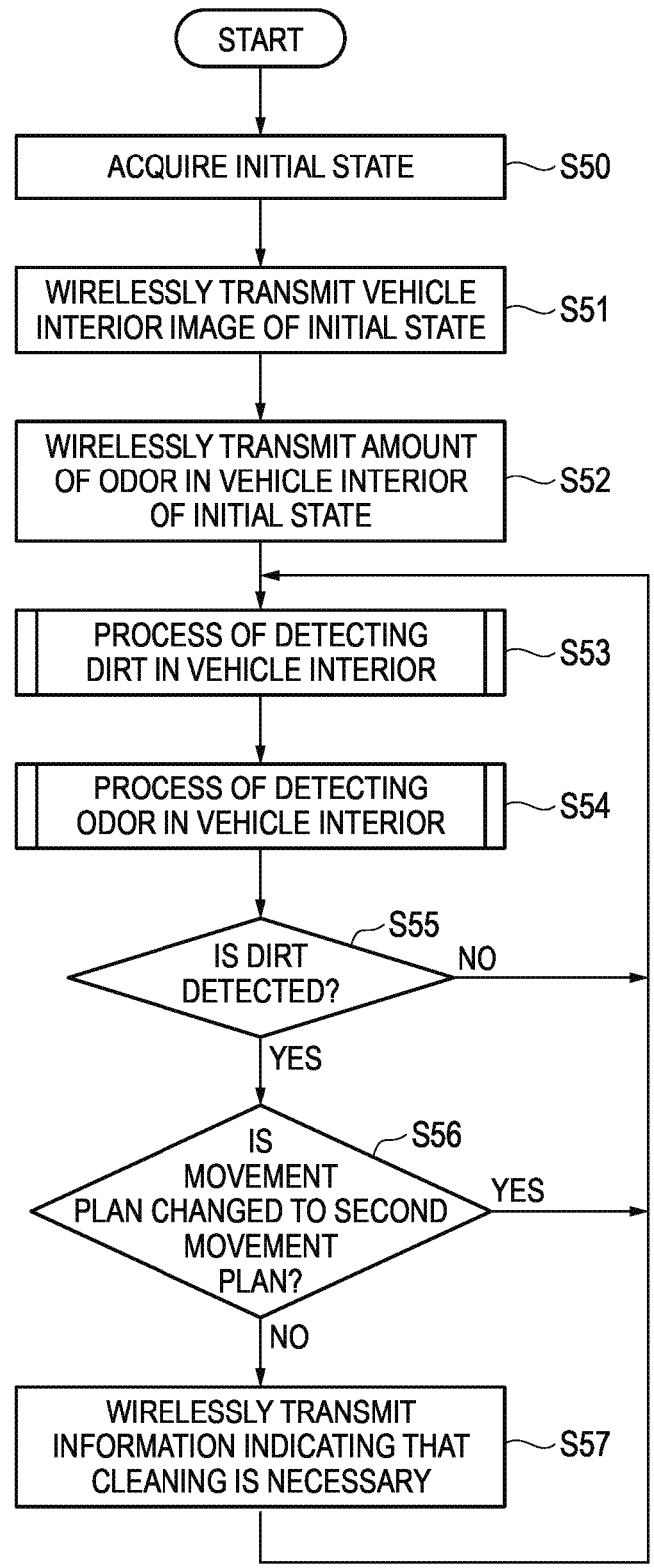
FIG. 21 is a flowchart for illustrating an operation of the autonomous commuter, which is a to-be-cleaned vehicle side, in the moving body management system of the second embodiment.

FIG. 21 is a flowchart for illustrating an operation of the autonomous commuter 2, which is a to-be-cleaned vehicle side, in the moving body management system 100 of the second embodiment. In FIG. 21, the vehicle control device 26 first acquires a vehicle interior image and an amount of odor in a vehicle interior in an initial state (step S50). After acquiring the vehicle interior image and the amount of odor of the initial state, the vehicle control device 26 wirelessly transmits the vehicle interior image of the initial state to the server device 4 (step S51), and subsequently transmits the amount of odor of the initial state to the server device 4 (step S52).

The vehicle control device 26 transmits the vehicle interior image and the amount of odor of the initial state to the server device 4, and thereafter executes a process of detecting dirt in the vehicle interior (step S53). Details of this process will be described later. After executing the process of detecting dirt in the vehicle interior, the vehicle control device 26 executes a process of detecting odor in the vehicle interior (step S54). Details of this process will be described later. After executing the process of detecting odor in the vehicle interior, the vehicle control device 26 determines whether dirt is detected (step S55). When dirt cannot be detected (when "NO" is determined in step S105), the process returns to step S53, and the processes of detecting dirt and odor in the vehicle interior are executed again.

On the other hand, when dirt can be detected (when "YES" is determined in step S55), the vehicle control device 26 determines whether a movement plan is changed to the second movement plan (step S56). When it is determined that the movement plan is changed to the second movement plan (when "YES" is determined in step S56), the process returns to step S53, and the processes of detecting dirt and odor in the vehicle interior are executed again. On the other hand, when it is determined that the movement plan is not changed to the second movement plan (when "NO" is determined in step S56), the vehicle control device 26 wirelessly transmits information indicating that cleaning is necessary to the server device 4 (step S57). After wirelessly transmitting the information indicating that cleaning is necessary to the server device 4, the vehicle control device 26 returns to step S53 and executes the processes of detecting dirt and odor in the vehicle interior again. The second movement plan will be described below.

Figure 22:
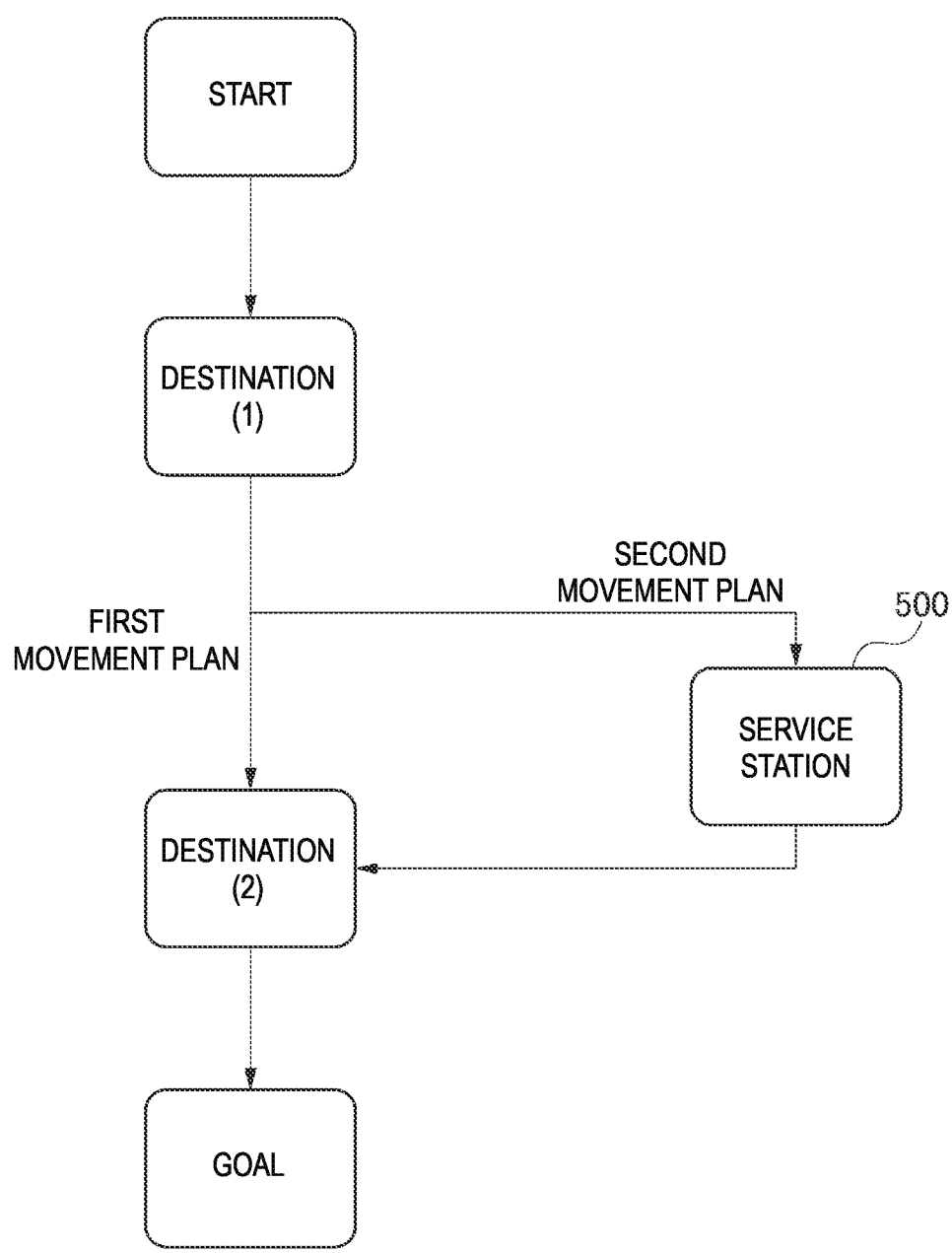
FIG. 22 is a diagram illustrating an example of a first movement plan and a second movement plan in the moving body management system of the second embodiment.

FIG. 22 is a diagram illustrating an example of the first movement plan and the second movement plan in the moving body management system 100 of the second embodiment. In FIG. 22, the first movement plan is a movement plan for going from a destination (1) to a destination (2) after start, and the second movement plan is a movement plan for going from the destination (1) to the destination (2) via a service station 500 after start. When vehicle interior cleaning is not necessary, the vehicle moves from the destination (1) to the destination (2) according to the first movement plan, and when vehicle interior cleaning is necessary, the movement plan is changed to the second movement plan for moving from the destination (1) to the destination (2) via the service station 500. It is assumed that there is a sanitation worker in the service station 500.

Figure 23:
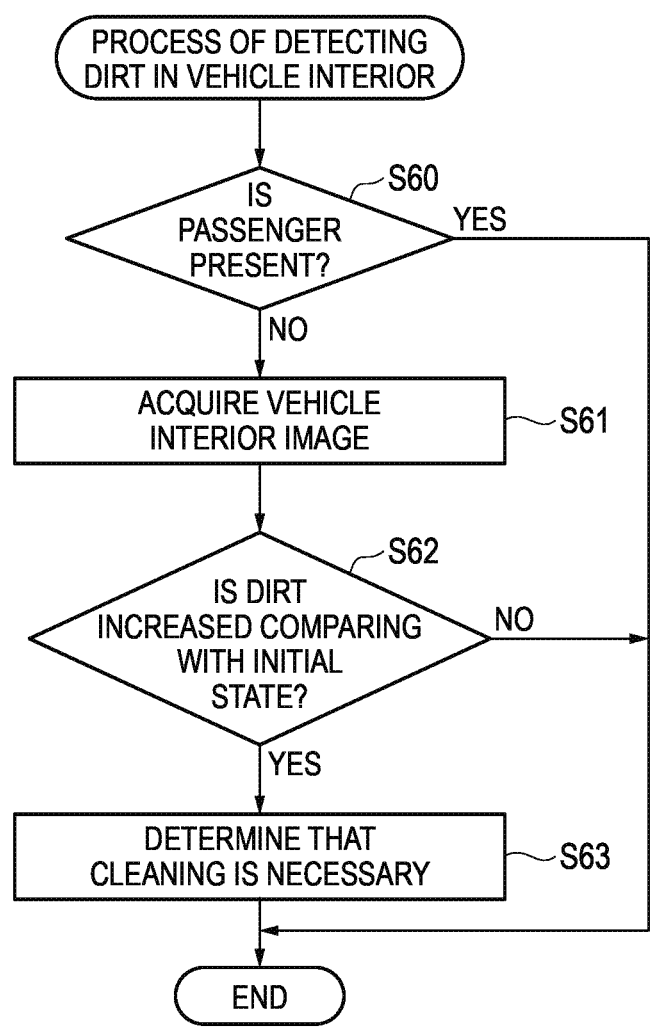
FIG. 23 is a flowchart for illustrating a process of detecting dirt in a vehicle interior in processing of FIG. 21.

FIG. 23 is a flowchart for illustrating the process of detecting dirt in the vehicle interior in the processing of FIG. 21. In FIG. 23, the vehicle control device 26 first determines whether a passenger is present (step S60). When the vehicle interior dirt sensor 27 is a camera, presence or absence of a passenger can be determined by performing image processing on an vehicle interior image obtained from the camera. When it is determined that a passenger is present ("YES" in step S60), vehicle control device 26 ends the process, and when it is determined that no passenger is present ("NO" in step S60), the vehicle control device 26 acquires a vehicle interior image from the vehicle interior dirt sensor 27 (step S61).

After acquiring the vehicle interior image, the vehicle control device 26 compares the acquired vehicle interior image with the image of the initial state, and determines whether dirt increases (step S62). When it is determined that dirt does not increase (when "NO" is determined in step S62), the vehicle control device 26 ends the present processing, and when it is determined that dirt increases (when "YES" is determined in step S62), the vehicle control device 26 determines that cleaning is necessary (step S63), and ends the present processing.

Figure 24:
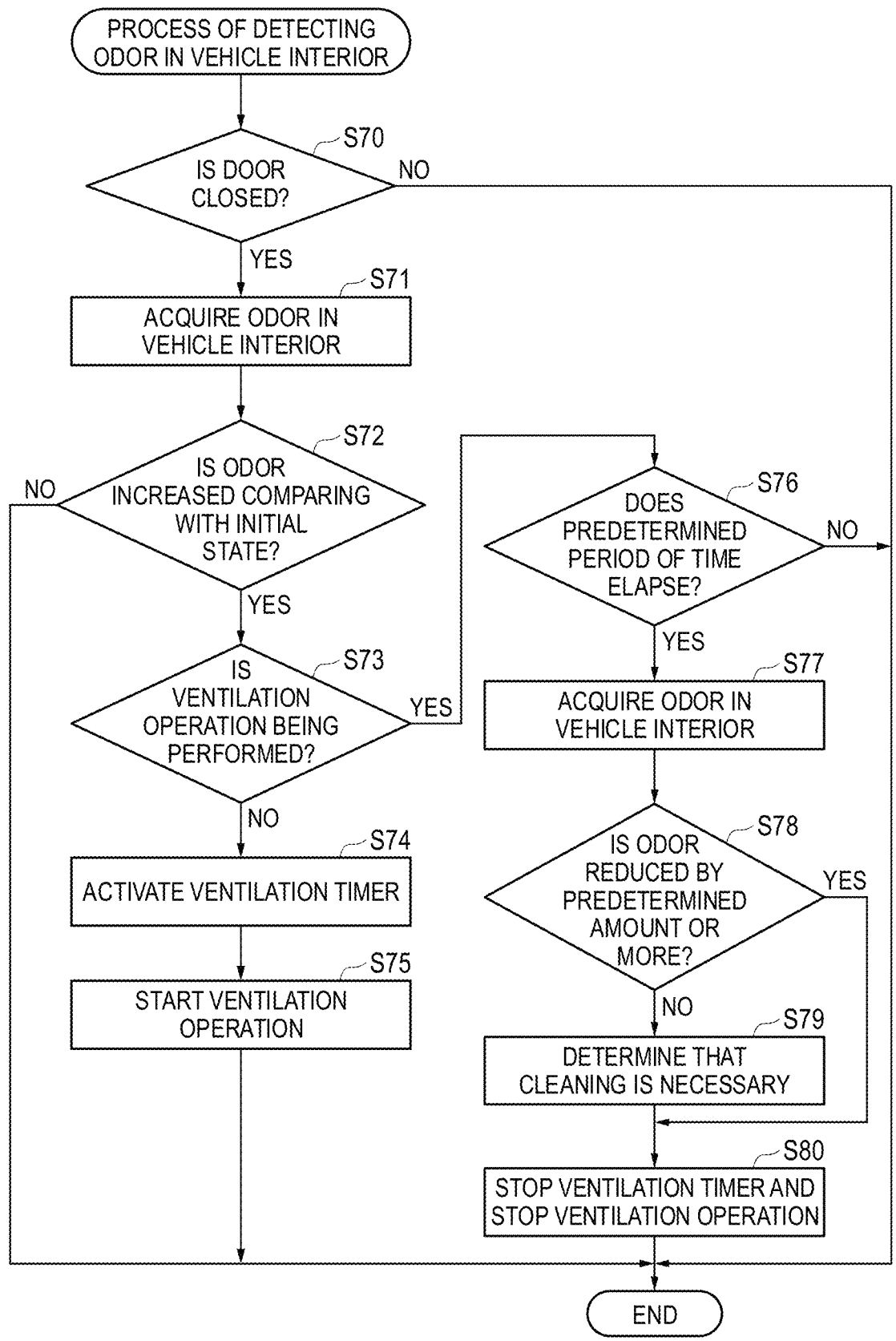
FIG. 24 is a flowchart for illustrating a process of detecting odor in a vehicle interior in the processing of FIG. 21.

FIG. 24 is a flowchart for illustrating the process of detecting odor in the vehicle interior in the processing of FIG. 21. In FIG. 24, the vehicle control device 26 first determines whether a door of the vehicle is closed (step S70). When it is determined that the door of the vehicle is not closed (when "NO" is determined in step S70), the present processing is ended. On the other hand, when it is determined that the door of the vehicle is closed ("YES" in step S70), odor in the vehicle interior is acquired based on an output of the vehicle interior odor sensor 28 (step S71). After odor in the vehicle is acquired, the vehicle control device 26 compares the acquired odor with the initial state, and determines whether odor increases (step S72). When it is determined that odor does not increase (when "NO" is determined in step S72), the vehicle control device 26 ends the present processing. On the other hand, when it is determined that odor increases (when "YES" is determined in step S72), it is determined whether the vehicle is performing a ventilation operation (step S73). When it is determined that the vehicle is not performing the ventilation operation (when "NO" is determined in step S73), the vehicle control device 26 activates a ventilation timer (included in the vehicle control device 26) (step S74), and thereafter starts the ventilation operation (step S75). After starting the ventilation operation, the vehicle control device 26 ends the present processing.

When it is determined in step S73 that the vehicle is performing the ventilation operation (when "YES" is determined in step S73), the vehicle control device 26 refers to the ventilation timer and determines whether a predetermined period of time elapses (step S76). When it is determined that the predetermined period of time does not elapse (when "NO" is determined in step S76), the present processing is ended. On the other hand, when it is determined that the predetermined period of time elapses (when "YES" is determined in step S76), odor in the vehicle interior is acquired again (step S77). Next, it is determined whether the acquired odor is reduced by a predetermined amount or more (step S78), and when it is determined that the acquired odor is not reduced by the predetermined amount or more (when "NO" is determined in step S78), it is determined that cleaning is necessary (step S79). Thereafter, the ventilation timer is stopped, and the ventilation operation is stopped (step S80). Thereafter, the present processing is ended. On the other hand, when it is determined that the acquired odor is reduced by the predetermined amount or more (when "YES" is determined in step S78), the ventilation timer is stopped, and the ventilation operation is stopped (step S80). Thereafter, the present processing is ended.

Figure 25:
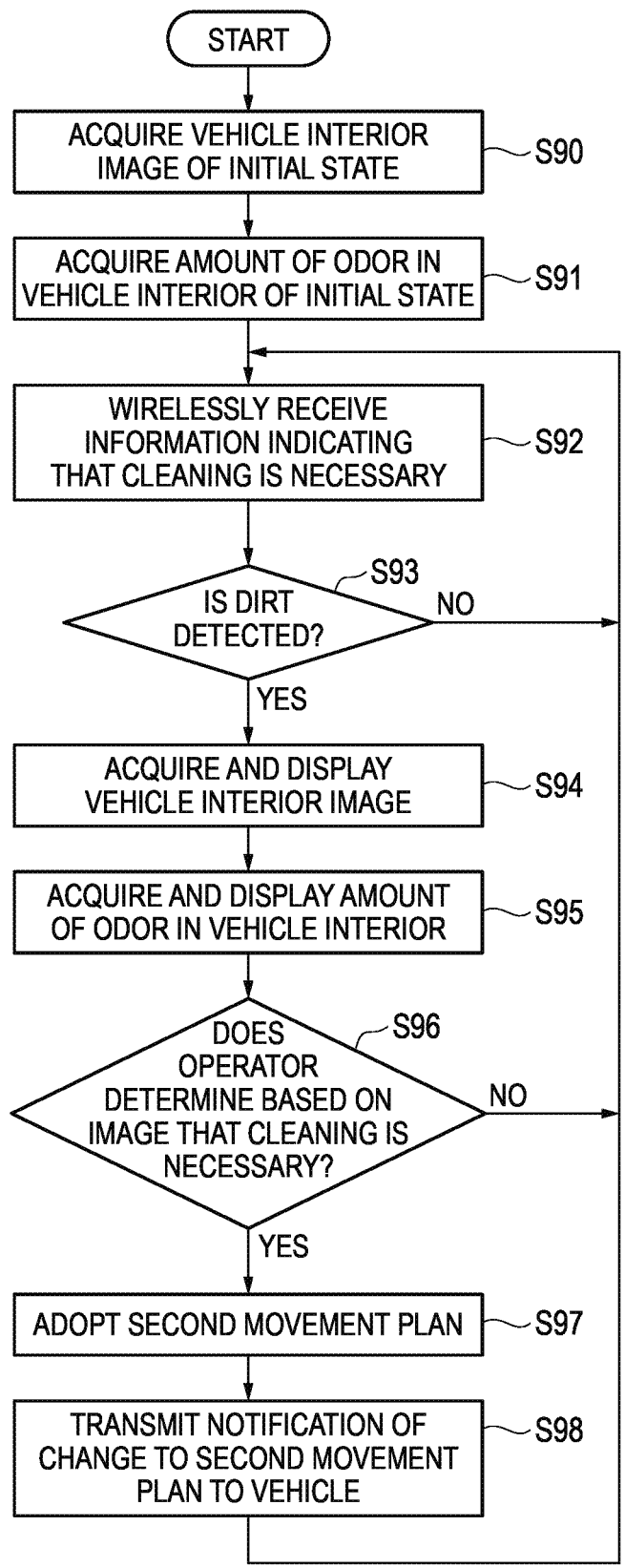
FIG. 25 is a flowchart for illustrating an operation of a server device related to cleaning of the moving body management system of the second embodiment.

FIG. 25 is a flowchart for illustrating an operation of the server device 4 related to cleaning. Since a subject of the operation of the server device 4 is the control device 41, the control device 41 is taken as a subject in the description. In FIG. 25, the control device 41 acquires a vehicle interior image of the initial state transmitted from the autonomous commuter 2 (step S90), and subsequently acquires an amount of odor in the vehicle interior of the initial state (step S91). The initial state is, for example, a state at a start time of the autonomous commuter 2. When wirelessly receiving the information indicating that cleaning is necessary (step S92) after the vehicle interior image of the initial state and the amount of odor in the vehicle interior of the initial state are acquired, the control device 41 determines whether dirt is detected (step S93), and when it is determined that dirt is not detected (when "NO" is determined in step S93), the control device 41 returns to step S92, and wirelessly receives the information indicating that cleaning is necessary.

On the other hand, when it is determined that dirt is detected (when "YES" is determined in step S93), the vehicle interior image is acquired and displayed on the display 42 (step S94). Further, the amount of odor in the vehicle interior is acquired and displayed on the display 42 (step S95). After the vehicle interior image and the amount of odor in the vehicle interior are acquired and displayed on the display 42, the control device 41 determines whether the operator 44 determines, based on the image displayed on the display 42, that cleaning is necessary (step S96). When the operator 44 determines that cleaning is necessary, the operator 44 performs an operation to that effect, and thus the control device 41 determines whether the operation is performed. In this determination, when the operator 44 does not determine that cleaning is necessary (when "NO" is determined in step S96), the process returns to step S92. On the other hand, when the operator 44 determines that cleaning is necessary (when "YES" is determined in step S96), the control device 41 adopts the second movement plan (step S97). That is, a route for stopping at the service station 500 is adopted. After adopting the second movement plan, the control device 41 transmits a notification indicating that the movement plan is to be changed to the second movement plan to the vehicle (the autonomous commuter 2) (step S98). Thereafter, the process returns to step S92.

As described above, according to the moving body management system 100 of the second embodiment, when there is dirt on a seat or a floor in the riding area 220 of the autonomous commuter 2 that is an unmanned vehicle, the dirt is notified to the operator 44 on the server device 4 side, and when the vehicle interior dirt sensor 27 detects predetermined dirt in the riding area 220 while the autonomous commuter 2 is moving according to the first movement plan, display is performed on the display 42 to indicate the second movement plan including a service station, different from the first movement plan, is proposed, and the operator 44 performs an operation of adopting the second movement plan with respect to the display, so that the autonomous commuter 2 starts moving according to the second movement plan. Thus, reliable and quick cleaning is possible and a clean environment in the vehicle can be provided at all time.

Although dirt in the vehicle is detected by the autonomous commuter 2 side in the moving body management system 100 of the present embodiment, dirt in the vehicle interior may be detected by the server device 4 side based on image information sent from the autonomous commuter 2 side, or a third device (not shown) may be provided between the autonomous commuter 2 and the server device 4, and dirt in the vehicle may be detected by the third device.

Third Embodiment

Next, a moving body management system according to a third embodiment will be described.

A moving body management system 300 of the present embodiment has a function of recognizing whether the bogie (moving body) 200 and the container 210 supported by the carriage 200 is a corresponding combination. Functions other than this function are the same as those of the moving body management system 1 of the first embodiment described above. In addition, since a configuration thereof is the same as that of the moving body management system 1 of the first embodiment, the block diagram of FIG. 1 is referred to.

As described above, the bogie 200 is a vehicle capable of moving autonomously. The bogie 200 includes at least one wheel and is capable of moving using the wheel. The wheel is driven by a drive unit including the electric motor 24, and power supply is supplied from the battery 25 to the electric motor 24 of the drive unit.

Figure 26:
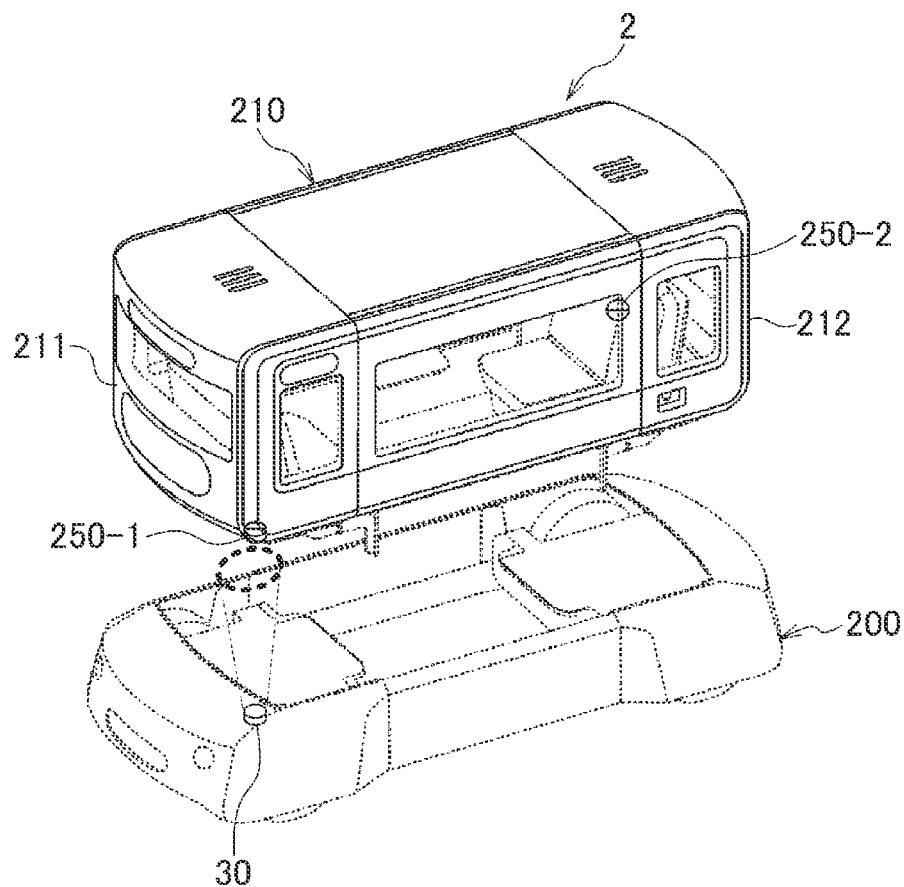
FIG. 26 is a perspective view illustrating an example of arrangement of an identifier and a mounted-container identification sensor in an autonomous commuter of a moving body management system according to a third embodiment.
Figure 27:
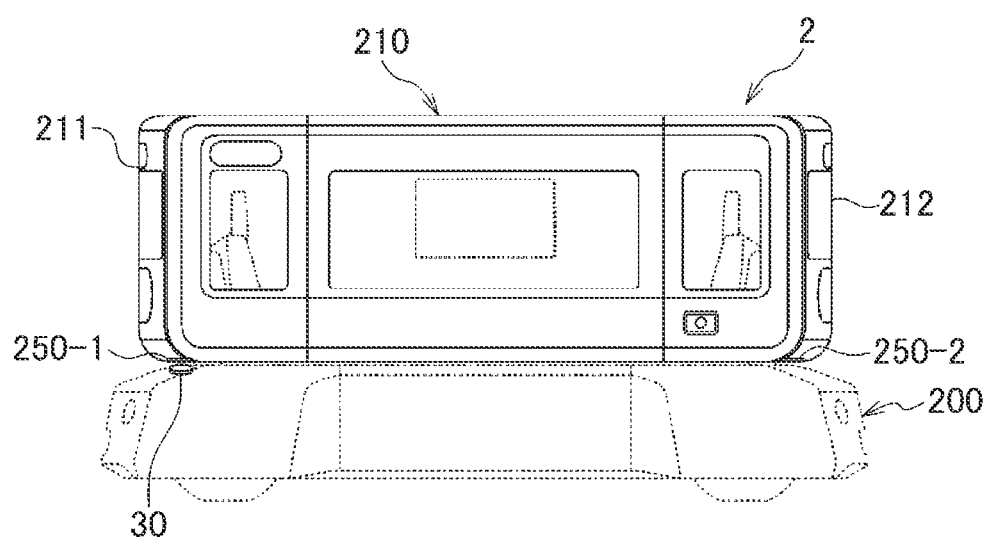
FIG. 27 is a side view illustrating an example of arrangement of an identifier and a mounted-container identification sensor in the autonomous commuter of the moving body management system according to the third embodiment.

A mounted-container identification sensor (detection circuit) 30 capable of detecting an identifier arranged in the container 210 is provided on the bogie 200. FIGS. 26 and 27 are perspective views illustrating an example of arrangement of identifiers 250-1 and 250-2 and the mounted-container identification sensor 30 in the autonomous commuter 2. In the example illustrated in FIGS. 26 and 27, the identifier 250-1 is arranged at one corner of the one end portion 211 of the container 210, and the identifier 250-2 is arranged at one corner (a corner on a diagonal line with the one corner of the one end portion 211) of the other end portion 212 opposite to the one end portion 211 of the container 210. That is, since the container 210 is symmetrical in the front and rear, the two identifiers are provided in point symmetry. The mounted-container identification sensor 30 is arranged at a position in the bogie 200 that faces the identifiers 250-1 and 250-2 arranged in the container 210.

As illustrated in FIG. 27, since the identifiers 250-1 and 250-2 are provided in point symmetry, one identifier 250 can be detected even when the front and rear of the container 210 are switched with respect to the bogie 200. In the example illustrated in FIGS. 26 and 27, two identifiers 250-1 and 250-2 are arranged on the container 210 side and one mounted-container identification sensor 30 is arranged on the bogie 200 side, and alternatively, the reverse may be adopted. That is, one identifier 250-1 is arranged on the container 210 side, and two mounted-container identification sensors 30 are arranged on the bogie 200 side. Also in this case, it is needless to say that the two mounted-container identification sensors 30 are arranged in point symmetry.

The container 210 is attachable to and detachable from the bogie 200, and when the container 210 is supported by the bogie 200, the mounted-container identification sensor 30 detects the identifier 250-1 or the identifier 250-2 of the container 210. Since the identifier 250-1 and the identifier 250-2 have the same content, the identifier 250-1 and the identifier 250-2 are hereinafter simply referred to as an identifier 250. When the mounted-container identification sensor 30 detects the identifier 250, the wireless communication circuit 29 provided in the bogie 200 transmits the detected identifier 250 at a predetermined time interval. When the mounted-container identification sensor 30 does not detect the identifier 250, the identifier 250 is not transmitted. The reason why the identifier 250 is not transmitted when the identifier 250 is not detected is that a case is assumed where the container 210 is gone. For example, in a case where a strong wind or the like blows and the container 210 is blown off, the identifier 250 is not transmitted because the container 210 is gone.

When the identifier 250 provided in the container 210 is not detected, the identifier 250 and a message indicating that the container 210 corresponding to the identifier 250 is not supported may be transmitted instead of not transmitting the identifier 250. That is, a notification may be made that the identifier 250 is not transmitted.

The predetermined time interval for transmitting the identifier 250 is preferably longer than a first period of time and shorter than a second period of time that is longer than the first period of time.

In addition, in a case where the container 210 is supported by the bogie 200, if the container 210 is locked to the bogie 200, it is possible to prevent the container 210 from slipping down or being blown off from the bogie 200.

As the mounted-container identification sensor 30, for example, a radio frequency identifier (RFID) circuit or a barcode reader circuit is suitable. When an RFID circuit is used, an RFID tag is provided in the container 210, and when a barcode reader circuit is used, a barcode is provided in the container 210. In addition, a method in which the identifier 250 is represented by a symbol or a character and is imaged and detected by a camera, a method in which an electrical contact is provided between the bogie 200 and the container 210 to detect the identifier 250 in a wired manner, or the like may be considered. The RFID detects the identifier 250 in a wireless manner.

When the identifier 250 received by the wireless communication circuit (communication circuit) 40 matches a predetermined identifier 250, the control device 41 of the server device 4 causes the display (display device) 42 of the server device 4 to display that the bogie 200 and the container 210 are a corresponding combination. In addition, when the wireless communication circuit 40 does not receive the identifier 250 for a predetermined time or more, the control device 41 causes the display 42 to display that there is no corresponding combination of the bogie 200 and the container 210. In this case, a message indicating that there is no container 210 to be supported may be displayed. When the wireless communication circuit 40 receives the identifier 250 and a message indicating that the container 210 corresponding to the identifier 250 is not supported, the control device 41 may cause the display 42 to display a message indicating that there is no corresponding combination of the bogie 200 and the container 210. Also in this case, a message indicating that there is no container 210 to be supported may be displayed.

As described above, the moving body management system 300 of the present embodiment can recognize whether there is a corresponding combination of the bogie 200 and the container 210 supported by the bogie 200. Therefore, the container 210 in a corresponding combination with the bogie 200 can be supported at all time, and for example, a mismatch does not occur in which the bogie 200 supports a container 210 capable of carrying a cargo even though the bogie 200 should support a container 210 capable of carrying a person.

Figure 28:
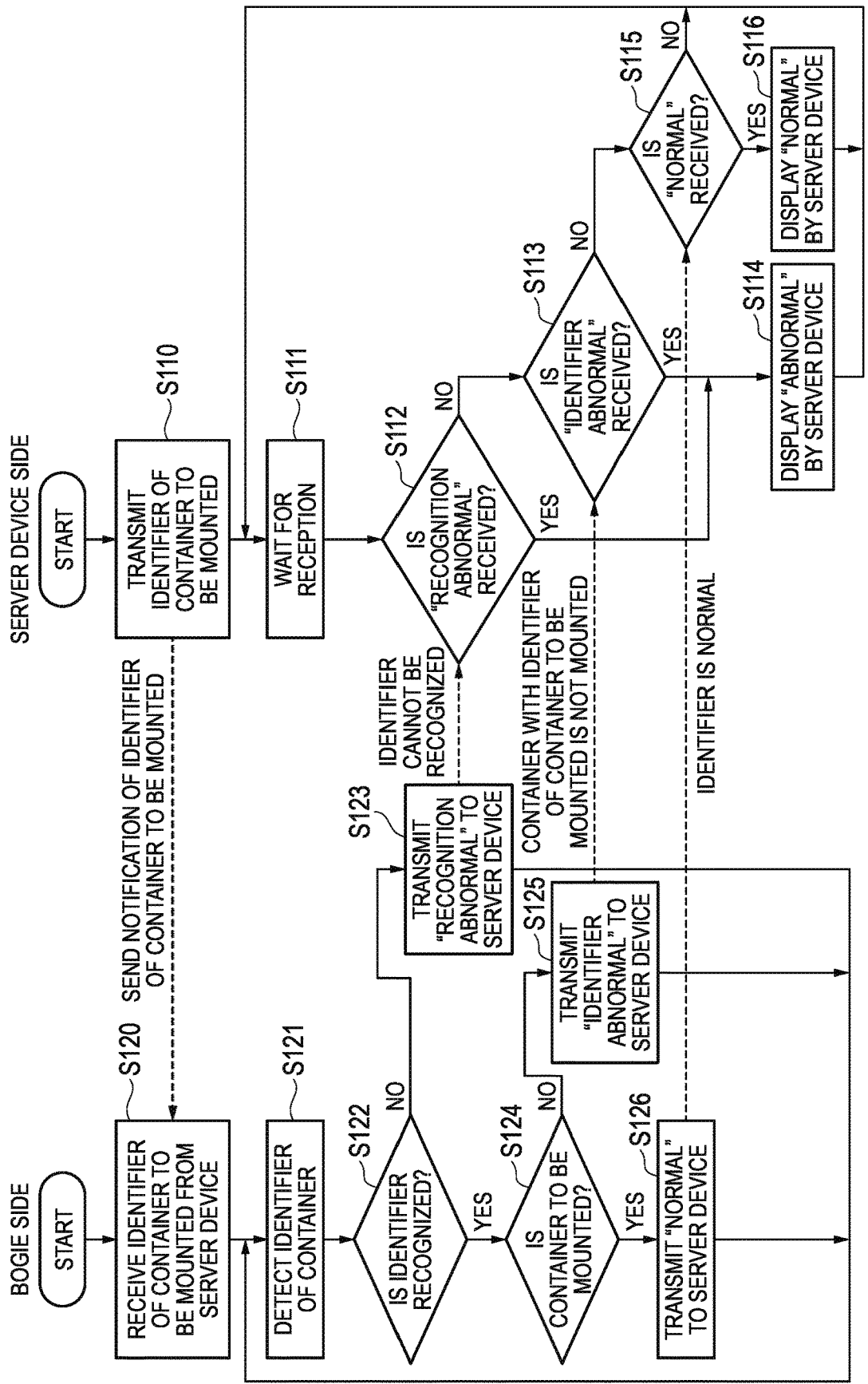
FIG. 28 is a flowchart for illustrating a container identification operation in the moving body management system according to the third embodiment.

FIG. 28 is a flowchart for illustrating a container identification operation of the moving body management system 300 of the third embodiment. On the bogie 200 side, a subject of the operation is the vehicle control device 26, and on the server device 4 side, a subject of the operation is the control device 41. Therefore, on the bogie 200 side, the vehicle control device 26 is taken as a subject, and on the server device 4 side, the control device 41 is taken as a subject.

In FIG. 28, the control device 41 first transmits an identifier of a container 210 to be mounted (step S110). After transmitting the identifier of the container 210, the control device 41 enters a reception waiting state (step S111). The control device 41 determines whether "recognition abnormal" is received in the reception waiting state (step S112). When it is determined that "recognition abnormal" is not received (when "NO" is determined in step S112), the control device 41 determines whether "identifier abnormal" is received (step S113). When it is determined that "identifier abnormal" is received (when "YES" is determined in step S113), the control device 41 displays "abnormal" by the server device 4 (step S114). That is, the control device 41 displays "abnormal" on the display 42 of the server device 4. After displaying "abnormal" on the display 42, the control device 41 returns to step S111 and enters the reception waiting state.

When it is determined that "identifier abnormal" is not received (when "NO" is determined in step S113), the control device 41 determines whether "normal" is received (step S115). When it is determined that "normal" is not received (when "NO" is determined in step S115), the control device 41 returns to step S111 and enters the reception waiting state. On the other hand, when it is determined that "normal" is received (when "YES" is determined in step S115), the server device 4 displays "normal" (step S116). That is, the control device 41 displays "normal" on the display 42. After displaying "normal" on the display 42, the control device 41 returns to step S111 and enters the reception waiting state.

On the other hand, on the bogie 200 side, the vehicle control device 26 receives the identifier of the container 210 to be mounted from the server device 4 (step S120), and temporarily stores the identifier. Next, the identifier 250 provided in the container 210 is detected (step S121). Then, it is determined whether the identifier 250 provided in the container 210 can be recognized (step S122), and when it is determined that the identifier 250 cannot be recognized (when "NO" is determined in step S122), "recognition abnormal" is transmitted to the server device 4 (step S123). Thereafter, the process returns to step S121. On the other hand, when it is determined that the identifier 250 provided in the container 210 can be recognized (when "YES" is determined in step S122), it is determined whether the container 210 is the container 210 to be mounted (step S124). When it is determined that the container 210 is not the container 210 to be mounted (when "NO" is determined in step S124), "identifier abnormal" is transmitted to the server device 4 (step S125), and the process returns to step S121. On the other hand, when it is determined that the container 210 is the container 210 to be mounted (when "YES" is determined in step S124), "normal" is transmitted to the server device 4 (step S126), and the process returns to step S121.

As described above, according to the moving body management system 300 of the third embodiment, the identifier 250 is provided in the container 210 supported by the bogie 200, and the mounted-container identification sensor 30 that detects the identifier 250 provided in the container 210 is provided on the bogie 200. When the mounted-container identification sensor 30 of the bogie 200 detects the identifier 250 of the container 210, the wireless communication circuit 29 of the bogie 200 transmits the identifier 250 of the supported container 210 at a predetermined time interval, and when it is determined that the identifier 250 received by the wireless communication circuit 40 matches the predetermined identifier, the control device 41 of the server device 4 causes the display 42 of the server device 4 to display that the bogie 200 and the container 210 are a corresponding combination, so that the container 210 in a corresponding combination with the bogie 200 can be supported at all time. For example, a mismatch does not occur in which the bogie 200 supports a container 210 capable of carrying a cargo even though the bogie 200 should support a container 210 capable of carrying a person.

In the moving body management system 300 of the present embodiment, the bogie 200 supports one container 210, and alternatively the number of containers to be supported may be two or more. In this case, each container 210 has a separate identifier. For example, in a case of two containers 210, one of a first container 210 has a first identifier, and the other of a second container 210 has a second identifier. The first container 210 can carry, for example, a person, and the second container 210 can carry, for example, a cargo.

The present disclosure provides a moving body configured to perform autonomous operation, and the moving body including: a first body including at least one wheel and configured to travel by the at least one wheel; a second body attachable to and detachable from the first body; and a display circuit arranged to face an outer side of the first body, wherein the display circuit is configured to display at least a first schematic pattern of a first eye and a second schematic pattern of a second eye.

According to the present disclosure, the display circuit is provided in the first body. Since the first body always travels, the display circuit is provided in the first body, so that it is possible to always display the schematic patterns of the eyes at the same position regardless of attachment and detachment of the second body, and it is easy for a person in the surroundings who meet the moving body every day to understand the schematic patterns. In addition, waste in a case of providing the display circuit in the second body that enters a use state only after being attached to the first body is avoided. That is, when the display circuit is provided in the second body that may be separated from the first body, the display circuit is wasted while being separated, which is not reasonable.

In the moving body of the present disclosure, the first body is configured to travel on a ground by the wheel, and when the second body is attached to the first body, at least a part of the second body is disposed above the first body in a vertical direction.

According to the present disclosure, since at least a part of the second body is disposed above the first body, the display circuit can be provided in a portion of the first body below the second body.

In the moving body of the present disclosure, the first body has a support surface which allows at least a part of the second body to be supported, and at least a part of the display circuit is disposed above the support surface in the vertical direction.

According to the present disclosure, since at least a part of the display circuit is disposed above the support surface in the vertical direction, display by the display circuit can be easily seen.

In the moving body of the present disclosure, at least a part of the first body includes a protruding portion protruding upward in the vertical direction with respect to the support surface, and at least a part of the display circuit is disposed in the protruding portion.

According to the present disclosure, at least a part of the first body includes the protruding portion protruding upward with respect to the support surface, and at least a part of the display circuit is disposed in the protruding portion, so that display by the display circuit can be easily seen.

In the moving body of the present disclosure, the protruding portion of the first body is foldable.

According to the present disclosure, the protruding portion provided in the first body is made foldable. Thus, for example, in a case where the display circuit is provided in the protruding portion, the protruding portion can be folded when the display circuit is not used, making it possible to avoid an impact from the outside, and the display circuit can be protected.

In the moving body of the present disclosure, a predetermined traveling direction is defined, and the display circuit is directed toward an outer side of the first body and is disposed at an end portion in the traveling direction.

According to the present disclosure, since the display circuit is directed toward the outer side of the first body and is disposed at the end portion in the traveling direction, it is possible to perform eye contact with a pedestrian, a person riding on a bicycle, and the like moving in front of the first body in the traveling direction.

The moving body of the present disclosure further includes at least a pair of lights provided at the end portion.

According to the present disclosure, it is possible to illuminate a front side of the moving body in the traveling direction, and it is possible to secure safety in nighttime traveling.

In the moving body of the present disclosure, the pair of lights includes a first light and a second light, and at least a part of the display circuit is disposed between the first light and the second light.

According to the present disclosure, since at least a part of the display circuit is disposed between the first light and the second light, it is easy to confirm the presence of the display circuit particularly at night.

In the moving body of the present disclosure, the pair of lights is disposed below the display circuit in the vertical direction.

According to the present disclosure, since the first light and the second light are disposed below the display circuit in the vertical direction, it is easy to confirm the presence of the display circuit, and the glare is reduced as compared with a case where the first light and the second light are disposed between the first light and the second light.

In the moving body of the present disclosure, the pair of lights is disposed above the display circuit in the vertical direction.

According to the present disclosure, since the first light and the second light are disposed above the display circuit in the vertical direction, it is easy to confirm the presence of the display circuit, and the glare is reduced as compared with a case where the first light and the second light are disposed between the first light and the second light.

In the moving body of the present disclosure, the display circuit is set as a first display circuit, the second body includes a third display circuit, and the third display circuit is configured to display at least a third schematic pattern of a third eye and a fourth schematic pattern of a fourth eye.

According to the present disclosure, since the second body includes the third display circuit, at least the third schematic pattern of the third eye and the fourth schematic pattern of the fourth eye can be displayed by the third display circuit.

In the moving body of the present disclosure, at a same time as the first display circuit displays the first schematic pattern and the second schematic pattern, the third display circuit displays the third schematic pattern and the fourth schematic pattern.

According to the present disclosure, the first schematic pattern and the second schematic pattern can be displayed by the first display circuit of the first body, and the third schematic pattern and the fourth schematic pattern can be displayed by the third display circuit of the second body.

In the moving body of the present disclosure, the first display circuit displays the first schematic pattern and the second schematic pattern, and the third display circuit does not display the third schematic pattern and the fourth schematic pattern.

According to the present disclosure, when the first schematic pattern and the second schematic pattern are displayed by the first display circuit of the first body, the display of the third schematic pattern and the fourth schematic pattern by the third display circuit of the second body can be prevented.

In the moving body of the present disclosure, the first display circuit does not display the first schematic pattern and the second schematic pattern, and the third display circuit displays the third schematic pattern and the fourth schematic pattern.

According to the present disclosure, when the third schematic pattern and the fourth schematic pattern are displayed by the third display circuit of the second body, the display of the first schematic pattern and the second schematic pattern by the first display circuit of the first body can be prevented.

In the moving body of the present disclosure, the display circuit includes as a first display circuit, the end portion includes a first end portion, and the moving body further includes a second display circuit directed toward an outer side of the first body and disposed at a second end portion opposite to the first end portion in the predetermined traveling direction.

According to the present disclosure, the first display circuit is directed toward the outer side of the first body and is provided at the one end portion of the first body in the traveling direction, and the second display circuit is directed toward the outer side of the first body and is provided at the other end portion opposite to the one end portion in the traveling direction, so that display by the first display circuit can be performed at the one end portion of the first body in the traveling direction, and display by the second display circuit can be performed at the other end portion opposite to the one end portion. For example, a schematic pattern of the eyes can be displayed by the first display circuit, and a schematic pattern imitating, for example, a tail of an animal can be displayed by the second display circuit.

In the moving body of the present disclosure, the autonomous operation includes autonomous driving.

According to the present disclosure, the moving body travels by autonomous driving.

According to the present disclosure, it is possible to provide a moving body having eyes that are capable of eye contact with a rich expression and can be configured at a low cost.

Although the present disclosure has been described in detail with reference to the specific embodiments, it will be apparent to those skilled in the art that various changes and modifications can be made without departing from the spirit and scope of the present disclosure.

The present application is based on Japanese Patent Application No. 2019-010518 filed on Jan. 24, 2019, Japanese Patent Application No. 2019-010519 filed on Jan. 24, 2019, and Japanese Patent Application No. 2019-010520 filed on Jan. 24, 2019 and Japanese Patent Application No. 2019-172123 filed on Sep. 20, 2019, the contents of which are incorporated by reference herein.

The moving body management system of the present disclosure is useful for a system that manages a vehicle capable of moving autonomously such as a motorcycle and an automobile.

The invention claimed is:

1. A vehicle configured to perform autonomous driving, the vehicle comprising:

a body including at least one wheel and configured to travel with the at least one wheel;
and
a display circuit arranged to face an outer side of the body,
wherein the display circuit is configured to display at least a first schematic pattern of a first eye and a second schematic pattern of a second eye, the first schematic pattern of the first eye including a first shape and a second shape that is smaller in area than the first shape, the second schematic pattern of the second eye including a third shape and a fourth shape that is smaller in area than the third shape,
wherein the first schematic pattern of the first eye changes between the first shape and the second shape with a time interval, and
wherein the second schematic pattern of the second eye changes between the third shape and the fourth shape with the time interval.

2. The vehicle according to claim 1,
wherein the body comprises a first body including the at least one wheel and configured to travel by the at least one wheel, and a second body attachable to and detachable from the first body,
wherein the first body is configured to travel on a ground by the at least one wheel, and
wherein when the second body is attached to the first body, at least a part of the second body is disposed above the first body in a vertical direction.

3. The vehicle according to claim 2,
wherein the first body has a support surface which allows at least a part of the second body to be supported, and
wherein at least a part of the display circuit is disposed above the support surface in the vertical direction.

4. The vehicle according to claim 3,
wherein at least a part of the first body comprises a protruding portion protruding upward in the vertical direction with respect to the support surface, and
wherein at least a second part of the display circuit is provided on the protruding portion.

5. The vehicle according to claim 4,
wherein the protruding portion of the first body is foldable.

6. The vehicle according to claim 5,
wherein the protruding portion is folded to be parallel to the support surface.

7. The vehicle according to claim 4,
wherein the protruding portion is movable in the vertical direction.

8. The vehicle according to claim 1,
wherein the display circuit is directed toward the outer side of the body and is disposed at an end portion in a traveling direction.

9. The vehicle according to claim 8, further comprising:
at least a pair of lights provided at the end portion.

10. The vehicle according to claim 9,
wherein the pair of lights comprises a first light and a second light, and
wherein at least a part of the display circuit is disposed between the first light and the second light.

11. The vehicle according to claim 9,
wherein the pair of lights is disposed below the display circuit in a vertical direction.

12. The vehicle according to claim 9,
wherein the pair of lights is disposed above the display circuit in a vertical direction.

13. The vehicle according to claim 2,
wherein the display circuit comprises a first display circuit,
wherein the second body comprises a third display circuit, and
wherein the third display circuit is configured to display at least a third schematic pattern of a third eye and a fourth schematic pattern of a fourth eye.

14. The vehicle according to claim 13,
wherein at a same time as the first display circuit displays the first schematic pattern and the second schematic pattern, the third display circuit displays the third schematic pattern and the fourth schematic pattern.

15. The vehicle according to claim 13,
wherein the first display circuit displays the first schematic pattern and the second schematic pattern during a predetermined time, and
wherein the third display circuit does not display the third schematic pattern and the fourth schematic pattern during the predetermined time.

16. The vehicle according to claim 13,
wherein the first display circuit does not display the first schematic pattern and the second schematic pattern during a predetermined time, and
wherein the third display circuit displays the third schematic pattern and the fourth schematic pattern during the predetermined time.

17. The vehicle according to claim 8,
wherein the display circuit comprises a first display circuit,
wherein the end portion comprises one end portion, and
wherein the vehicle further comprises a second display circuit directed toward the outer side of the body and disposed at a second end portion opposite to the first end portion in the traveling direction.

18. The vehicle according to claim 17,
wherein the second display circuit is configured to display a fifth schematic pattern different from the first schematic patter and the second schematic pattern.

19. The vehicle according to claim 18,
wherein the first display circuit and the second display circuit are configured to display the first schematic pattern and the second schematic pattern when positioned on a front side in the traveling direction and display the fifth schematic pattern when positioned on a rear side in the traveling direction.

20. The vehicle according to claim 1,
wherein the body includes a riding area configured for a passenger to ride on.

* * * * *